(12) United States Patent
Kobayashi et al.

(10) Patent No.: US 7,012,625 B1
(45) Date of Patent: Mar. 14, 2006

(54) IMAGE QUALITY CORRECTING CIRCUIT

(75) Inventors: Masayuki Kobayashi, Kanagawa-ken (JP); Masamichi Nakajima, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/700,495

(22) PCT Filed: Mar. 27, 2000

(86) PCT No.: PCT/JP00/01872

§ 371 (c)(1),
(2), (4) Date: Nov. 14, 2000

(87) PCT Pub. No.: WO00/60566

PCT Pub. Date: Oct. 12, 2000

(30) Foreign Application Priority Data

| Mar. 31, 1999 | (JP) | ................................. 11/092014 |
| Sep. 30, 1999 | (JP) | ................................. 11/280633 |
| Oct. 29, 1999 | (JP) | ................................. 11/309224 |

(51) Int. Cl.
*G09G 5/10* (2006.01)
*H04N 5/14* (2006.01)

(52) U.S. Cl. .................. 345/690; 348/671; 682/168

(58) Field of Classification Search .................. 345/63, 345/76, 77, 88, 89, 690–693; 348/671–675; 382/167–172.2; G09G 3/20, 3/36, 5/10; H04N 5/202
See application file for complete search history.

(56) References Cited

U.S. PATENT DOCUMENTS

| 4,979,136 A | * | 12/1990 | Weiman et al. ............. 382/169 |
| 5,808,697 A | * | 9/1998 | Fujimura et al. ........... 348/672 |
| 6,219,447 B1 | * | 4/2001 | Lee ........................... 382/168 |
| 6,266,102 B1 | * | 7/2001 | Azuma et al. .............. 348/671 |
| 6,504,954 B1 | * | 1/2003 | Goldstein .................. 382/168 |

* cited by examiner

*Primary Examiner*—Alexander Eisen
(74) *Attorney, Agent, or Firm*—Flynn, Thiel, Boutell & Tanis, P.C.

(57) ABSTRACT

The image quality correcting circuit according to the present invention is made up of a mean value computer 10 for computing the mean value of the luminance levels of every plural picture element of a video signal inputted to a video signal input terminal 12, an occurrence frequency counter 13 for counting the occurrence frequency data of plural luminance levels computed by the mean value computer 10, a linear interpolator 15 for forming a correcting characteristic line based on the output points of the counted value from the occurrence frequency counter 13, and an image quality corrector 16, and wherein the linear interpolator 15 provides the correcting characteristic line consisting of a linearly interpolated series of continuous segments, which are obtained by sequentially connecting the luminance levels of an x-axis and the occurrence frequencies on a y-axis, and the image quality corrector 16 corrects the video signals inputted from the video signal input terminal 12 according to the linearly interpolated correcting characteristic line.

22 Claims, 13 Drawing Sheets

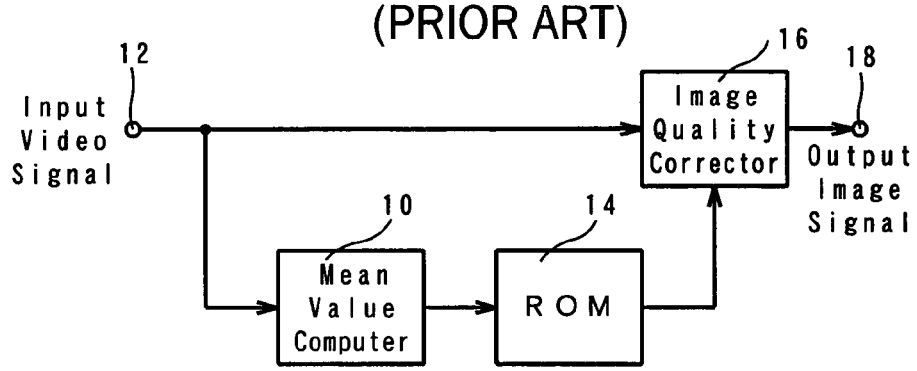
Fig. 1
(PRIOR ART)
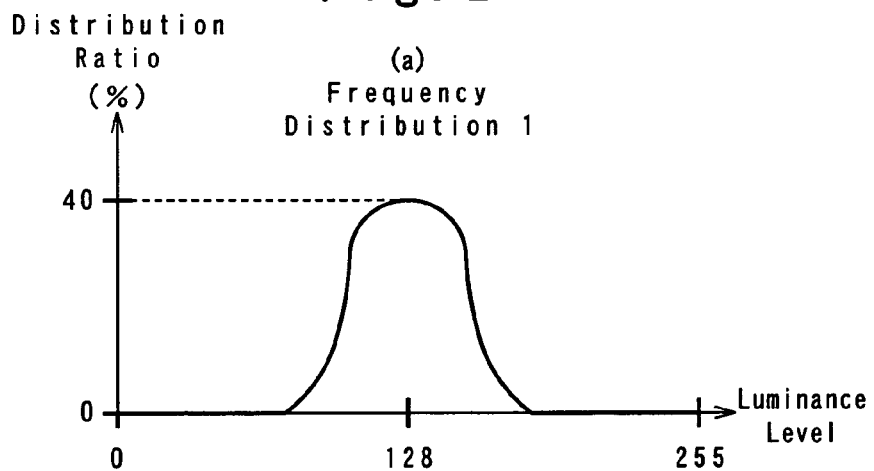
Fig. 2
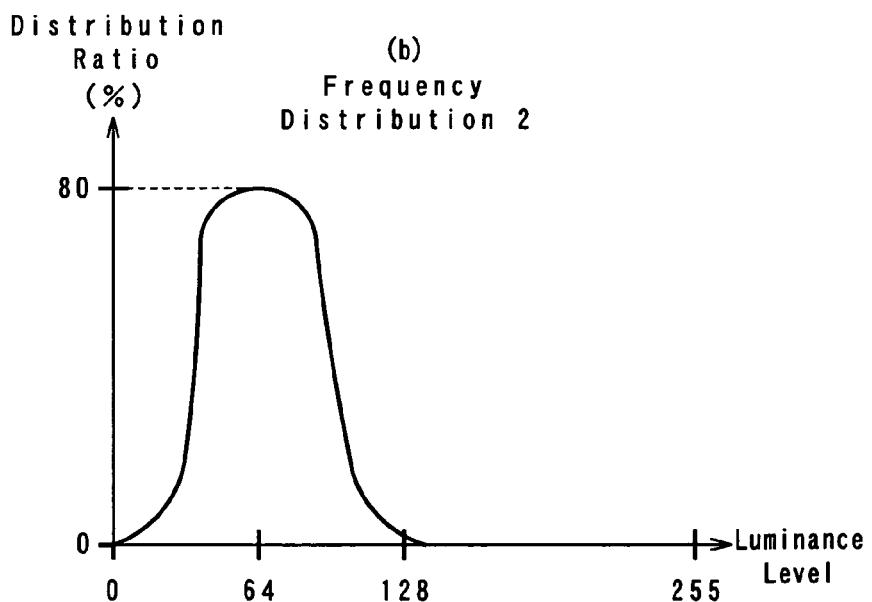

Distribution Ratio

Correcting Characteristic

IMAGE QUALITY CORRECTING CIRCUIT

TECHNICAL FIELD OF THE INVENTION

The present invention relates to an image quality correcting circuit for the image quality correction (e.g., tone correction of an image, depending on the content of the image, in the cases where display panels such as a plasma display panel (PDP), liquid crystal display panel (LCD) and the like are used.

BACKGROUND ART

A conventional image quality correcting circuit, as is shown in FIG. 1, is designed so that the average image level (APL) for every 1 frame (or 1 field) is detected by an average value computer 10, and a corresponding correcting data is read out from a ROM 14 according to the APL, which serves as an address, in order to correct the inputted video signal, for being outputted from an output terminal 18, by an image quality corrector 16 according to an input/output conversion characteristic curve corresponding to the correcting data. The APL is obtained, for example, by dividing the sum of the products of the total number of display dots of each frame (or each field) and the occurrence frequency (number of times of occurrence) distribution of each luminance level by the total number of the dots.

However, according to the conventional case as is shown in FIG. 1, since the image quality correcting data is based on the APL, the display quality of the image can be improved where the brightness is evenly distributed in a given image but cannot be improved according to the content of the image because of a problem, that is, the lack of the consideration of the luminance level histogram (the luminance level occurrence frequency distribution).

For example, assume that there are case 1 of the luminance level occurrence frequency distribution where the luminance levels on the bright side are predominant as shown in FIG. 2(a), and case 2 of the luminance level occurrence frequency distribution where the luminance levels on the dark side is predominant as shown in FIG. 2(b). Assuming that the APL's are equal irrespective of the different luminance levels, there occurs a problem that, in the case shown FIG. 2(a), the resolution on the bright side becomes poor, while, in the case shown in FIG. 2(b), the resolution on the dark side becomes poor. Especially, as shown in FIG. 3, in the case where the luminance level occurrence frequency distribution is predominant in a narrow area on the dark side where the luminance level is low, this gives rise to a problem that the correcting characteristic curve tends to have an extremely inclined portion, causing the brightness of the image to become greater than necessary and the resultant decline of the resolution of the image on the bright side. The same is true of the case where the luminance level occurrence frequency distribution is predominant on the brighter side of the image.

In order to resolve the above-mentioned problems, the present applicant has already proposed a video signal correcting circuit as is shown in FIG. 5 under the Laid-Open Japanese Patent Application No. 8-23460. According to the proposed circuit, the inputted video signals S0, comprising analog R (Red), G (Green) and B (Blue) signals, are converted into digital R, G and B signals through an A/D 20 (Analog/Digital converter) and inputted, as a lower-rank address, to a ROM 22 (Read-Only Memory) for the input/output conversion, that is, the tone correction by the table look-up method. On the other hand, the Y-signal (luminance signal) is generated from the analog R, G and B signals by a matrix circuit 24, and the Y-signal is converted into a digital signal by the A/D 26 for input to a histogram circuit 28. The histogram circuit 28 counts the luminance level occurrence frequency (distribution) for each of the luminance level range divided into plural ranges (e.g., 4 ranges). A decoder 30 decodes the result of the count by the histogram circuit 28 for input, as a higher-rank address, to the ROM 22 for selecting the tone correcting characteristic data previously stored in the ROM 22, thereby correcting the tones of the inputted digital R, G and B signals to be outputted as the digital R, G and B signals S1.

With the video signal correcting circuit shown in FIG. 5, tone correction according to the occurrence frequency distribution of the luminance level of the inputted video signal can be made, but such a circuit still has a problem that the correcting characteristic corresponding to the occurrence frequency of each luminance level cannot be obtained.

The present invention is made in order to solve the above problems of the prior art and is intended to provide an image quality correcting circuit applicable for the correction of all kinds of images based on a best correcting characteristic corresponding to the occurrence frequency of each luminance level.

DISCLOSURE OF THE INVENTION

A first embodiment of the present invention is an image quality correcting circuit comprising a mean value computer 10 for computing the mean value of the luminance levels of all the plural picture elements of the video signal inputted to a video signal input terminal 12, a counter 13 for counting the occurrence frequency of each of plural luminance levels counted by the mean value computer 10, a linear interpolator 15 for providing a correcting characteristic curve by linear interpolation based on the counted value output point of the occurrence frequency counter 13, and an image quality corrector 16 for correcting the inputted video signal according to the correcting characteristic curve.

In such a composition, the video signal inputted to a video signal input terminal 12 is processed by the mean value computer 10 for determining the mean value of (luminance levels) of plural picture elements for output, thereby computing the occurrence frequency of each luminance level. The linear interpolator 15 graphically provides a linear interpolation characteristic line consisting of a series of continuous segments with the luminance levels plotted on the y-axis and the occurrence frequency plotted on the x-axis.

The image quality corrector 16 processes the video signal inputted from the video signal input terminal 12 to correct the image quality according to the correcting characteristic line provided by the linear interpolator and outputs the corrected video signal from the video signal output terminal 18.

The second embodiment of the present invention is an image quality correcting circuit comprising the counter 13 for counting the occurrence frequency of the plural luminance levels sampled from the video signal inputted to the video signal input terminal 12 for each of the predetermined levels, a correcting curve generator 25 for generating a new correcting curve based on the data outputted from the counted value output point of the luminance level occurrence frequency counter 13 and the data of the predetermined set points inserted among the counting points, and the image quality corrector 16 for correcting the inputted video signal according to the correcting curve provided by the correcting curve generator 25.

In such a composition, the data of every other occurrence frequency of (the luminance level) of the video signal inputted to the video signal input terminal 12 is used, and, on the other hand, the set data corresponding to the predetermined luminance levels plotted on the straight line connecting the graphic start point and end point is inputted so that these data can be rearranged in the order of the luminance level to interpolate one another for generating a Bezier curve. The video signal inputted from the video signal input terminal 12 is processed for the image quality correction according to the Bezier curve and outputted from the video signal output terminal 18.

The third embodiment of the present invention comprises an occurrence frequency counter for counting the occurrence frequency of the luminance level of each picture element of the inputted video signal within N number of frames (N=any integer of 1 or more) for every plural set level ranges, a variation controller for controlling, for output, the variation of the counted value of the occurrence frequency counter to a variation within a period ranging plural times of the N-frame period, a linear interpolator for providing a correcting characteristic line by the interpolation based on the counted value outputted from the variation controller, and an image quality corrector for correcting the inputted video signal by the linear interpolator according to the correcting characteristic line provided by the linear interpolator.

In such a composition, when the inputted video signal is then inputted to the luminance level occurrence frequency counter, the occurrence frequency of the luminance level of each picture element within N number of frames is counted by the occurrence frequency counter for every plural set level ranges. Since the variation of the counted value of the occurrence frequency counter is controlled to the variation during a period ranging plural times of the N-frame period by the variation controller, the variation of the correcting characteristic line generated by the linear interpolator is also controlled. The image quality corrector correcting the inputted video signal according to the variation-controlled correcting characteristic line.

The fourth embodiment of the present invention comprises a counter for counting the occurrence frequency of the luminance level of each picture element within N frames for every plural set level range, a variation controller for controlling, for output, the variation of the counted value of the occurrence frequency counter to the variation during a period ranging plural times of the N number of frames, a correcting curve generator for generating a new correcting curve based on the counted value outputted from the variation controller and the predetermined set value, and an image quality corrector for correcting the inputted video signal according to the correcting curve generated by the correcting curve generator.

In the above composition, when the video signal is inputted to the luminance level occurrence frequency counter, the occurrence frequency of the luminance level of each picture element is counted for every plural set level range. Since the variation of the counted value of the occurrence frequency counter is controlled to the variation during the period ranging plural times of the N-frame period and inputted to the correcting curve generator, the variation of the correcting curve generated by the correcting curve generator is also controlled. For the image quality correction processing, the image quality corrector corrects the inputted video signal according to the variation-controlled correcting curve.

In order to simplify the composition of the occurrence frequency counter, a mean value computer for computing the mean value of the luminance levels for every m number of picture elements is provided so that the occurrence frequency counter counts the occurrence frequency of the luminance level for every predetermined plural set level range.

In order to simplify the composition of the occurrence frequency counter by eliminating the adder, the occurrence frequency counter is made to comprise a plurality of discriminators for determining whether the luminance level of each picture element corresponds to each of the plural set level ranges, a plurality of first counters for counting the frequency of discrimination made by each of the discriminators, a plurality of comparators for comparing the counted value of the first counter with a predetermined referenced value and for clearing the first counter by the output from the comparator, and a plurality of second counters for counting the frequency of the output from the comparator to determine the occurrence frequency (of the luminance level).

In order to simplify the composition of the occurrence frequency counter by eliminating the adder, the occurrence frequency counter comprises a plurality of discriminators for determining whether or not the luminance level computed by the mean value computer corresponds to each of the plural set level ranges, a plurality of first counters for counting the frequency of discrimination made by each discriminator, a plurality of comparators for comparing the counted value of the first counter and the predetermined reference value to clear the first counter by the output from the first comparator, and a plurality of second counters for counting the output frequency of the comparator to determine the occurrence frequency.

In order to simplify the composition of the variation controller, the variation controller comprises a difference detector, a constant multiplier, an adder and an N-frame delayer so that the difference detector outputs the difference between the counted value of the occurrence frequency counter and the output from the N-frame delayer; the constant multiplier outputs the product of the output of the difference detector and 1×X (X=an integer of 2 or more); the adder adds the outputted value from the constant multiplier to the outputted value of the N-frame delayer; the N-frame delayer delays the sum obtained by the adder by N frames for output not only as the output to the difference detector and the adder but also as the variation-controlled output.

The fifth embodiment of the present invention is an image quality correcting circuit comprising the occurrence frequency counter 13 for counting the occurrence frequency of the plural luminance levels sampled from the video signal inputted to the video signal input terminal 12 as to each of the predetermined luminance levels, a correcting characteristic point control circuit 29 for selectively outputting an upper limit value when the counted value of the correcting characteristic point outputted from the occurrence frequency counter 13 is greater than the predetermined upper limit value or outputting a lower limit value when the value is smaller than the (predetermined) lower limit value or outputting the counted value when the counted value is within the range from the upper limit value and the lower limit value, a correcting curve generator 48 for generating a correcting curve according to the output from the correcting control point control circuit 13, and an image quality corrector 16 for correcting the inputted video signal according to the correcting characteristic curve generated by the correcting curve generator 48, the image quality correcting circuit being further designed so that the upper limit value and the lower limit value of the counted value of the correcting characteristic point are set to an+w and an−w so as to linearly vary respectively.

The sixth embodiment of the present invention is an image quality correcting circuit according to the fifth embodiment, wherein the upper limit value and the lower limit value are set to the upper limit value YHn and the lower limit value YLn, varying around the middle portion of a quadratic curve passing the graphic start point and graphic end point of a correcting characteristic diagram plotted on the x-axis, representing the inputted luminance level, and the y-axis, representing the outputted luminance level, of a rectangular coordinates.

BRIEF DESCRIPTION OF THE DRAWINGS

FIG. 1 is a block diagram of a conventional image quality correcting circuit.

FIG. 2 is a video signal luminance level occurrence frequency distribution diagram, wherein (a) represents a case where the luminance levels concentrate mainly around the mean value, while (b) represents a case where the luminance levels concentrate mainly within range of low values.

BEST MODE FOR CARRYING OUT THE INVENTION

The image quality correcting circuit as the first embodiment of the present invention will be described in the following referring to FIGS. 6, 7 and 8.

Figure 3:
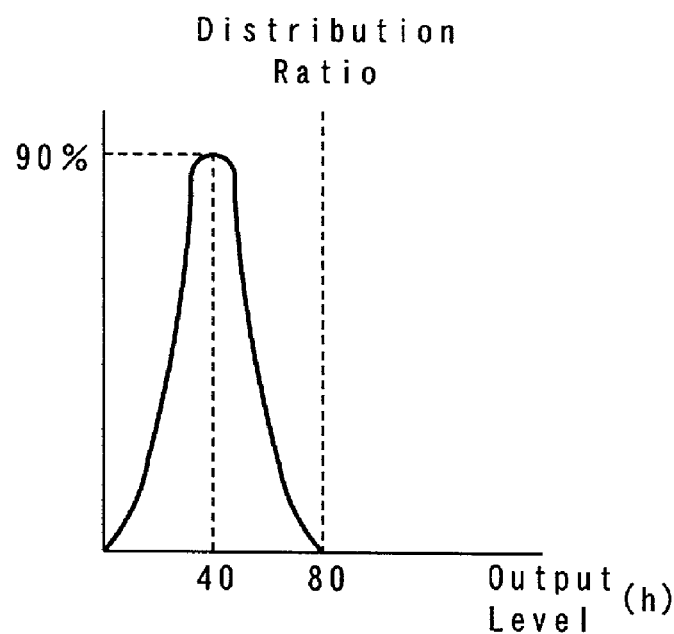
FIG. 3 is an occurrence frequency distribution diagram showing the luminance leels of the video signals concentrating within an narrow range on the side of low levels.
Figure 4:
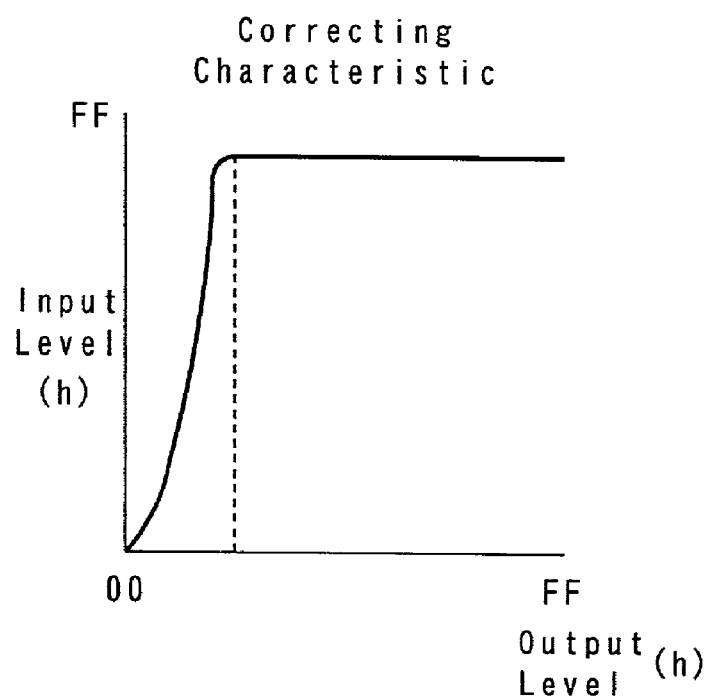
FIG. 4 shows a correcting characteristic line according to the case of FIG. 3.
Figure 5:
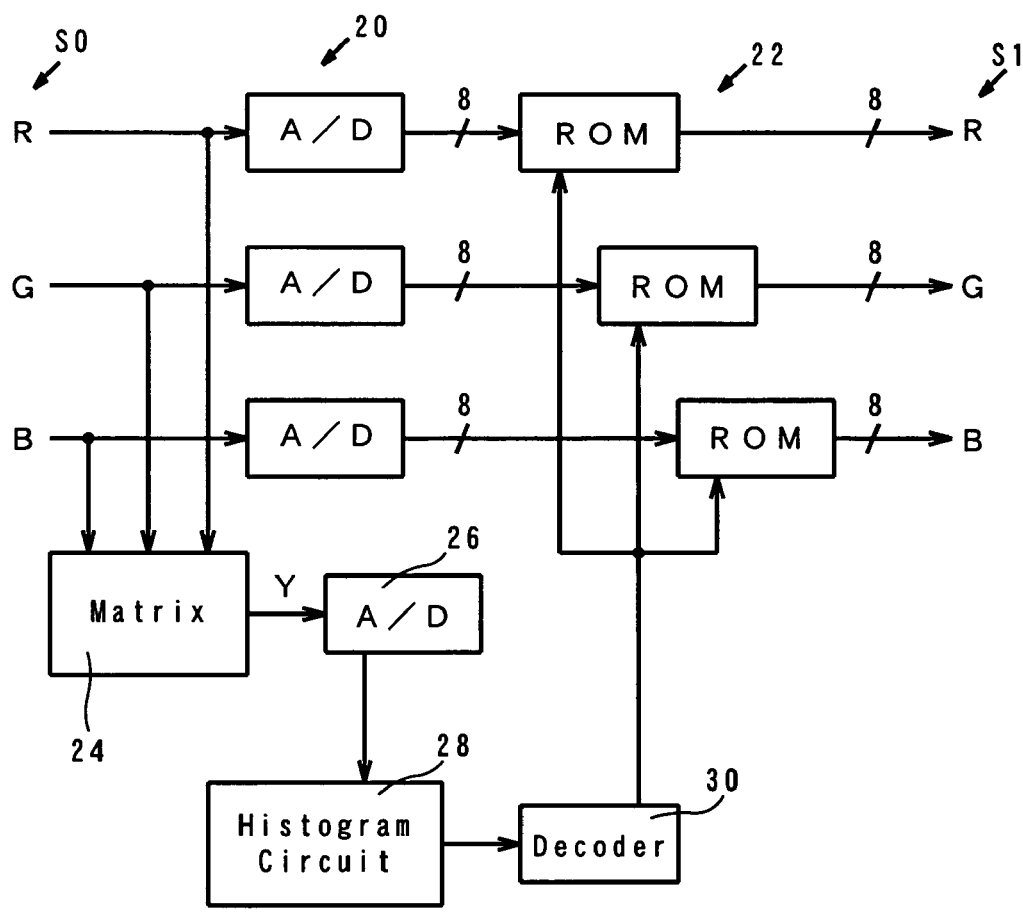
FIG. 5 shows another example of a conventional image quality correcting circuit.
Figure 6:
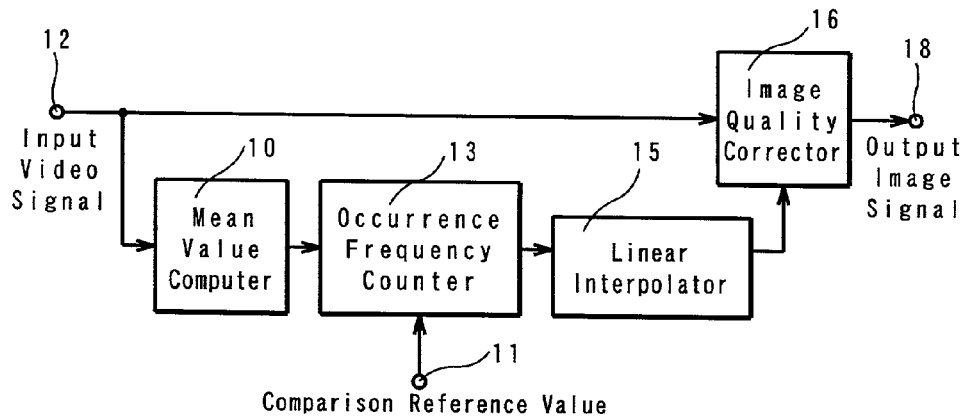
FIG. 6 is a bock diagram showing the whole image quality correcting circuit as the first embodiment of the present invention.

In FIG. 6, numeral 12 represents the video signal input terminal whereto the video signal is to be inputted; 10, the mean value computer for computing the mean value of the luminance levels at m number of points (m=an integer of 2 or more); 13, the occurrence frequency counter for sequentially counting the occurrence frequency of previously set different luminance levels beginning from 0 level; 11, the comparison reference value input terminal; 15, the linear interpolator for obtaining correcting characteristic point based on the occurrence frequency data; 16, the image quality corrector for correcting image quality based on the linear interpolation; 18, the video signal output terminal for outputting a corrected video signal.

Figure 7:
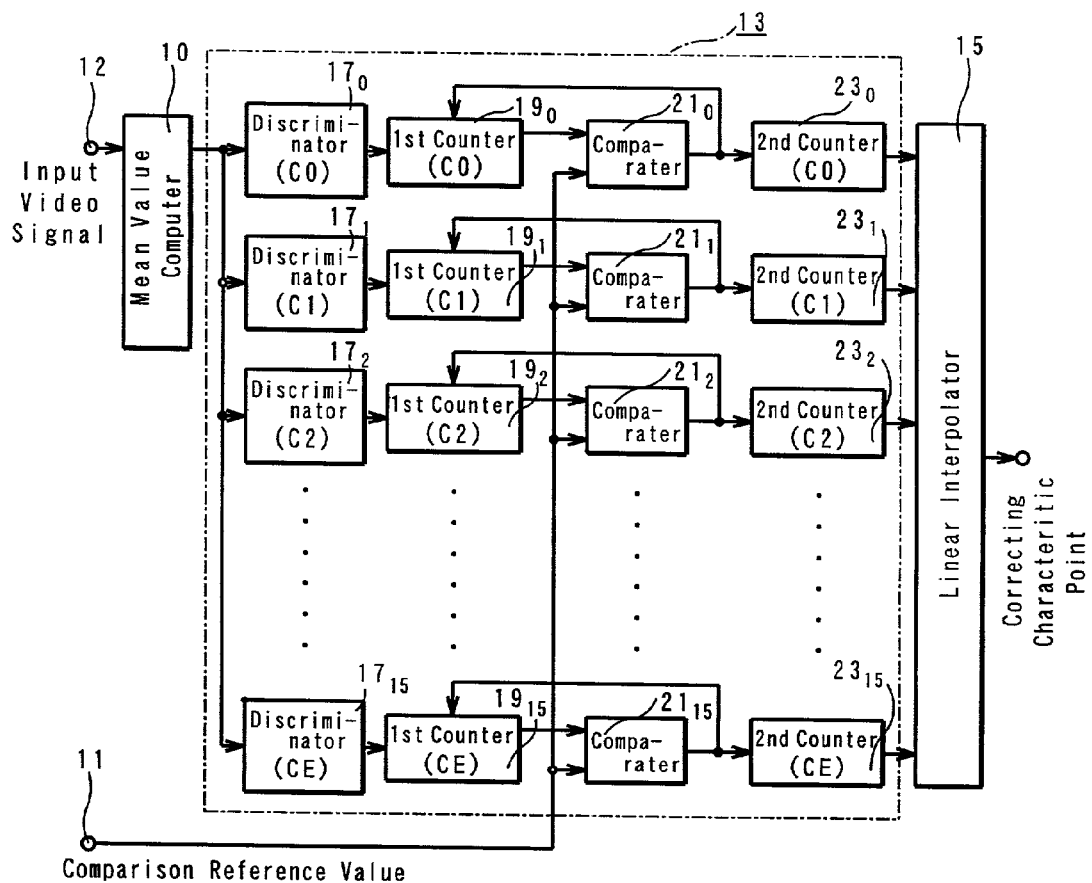
FIG. 7 is a block diagram showing the detail of the occurrence frequency counter 13 shown in FIGS. 6, 9, 12 and 15.

FIG. 7 is a circuit diagram of the occurrence frequency counter showing a greater detail.

The mean value computer 10 is designed to compute the mean value of, for example, 16 luminance levels, thereby reducing the number of bits for the subsequent occurrence frequency counter 13.

The occurrence frequency counter 13 comprises, for example, 16 discriminators $17_0$, $17_1$, . . . $17_{15}$, the first counters $19_0$, $19_1$, . . . $19_{15}$ respectively and sequentially connected to the discriminators, the comparators $21_0$, $21_1$, . . . $21_{15}$, the second counters $23_0$, $23_1$, . . . $23_{15}$, the comparison reference value input terminal 11 connected to the other input sides of the comparators; wherein the outputs from the comparators $21_0$, $21_1$, . . . $21_{15}$ are returned, as clear signals, to the first counters $19_0$, $19_1$, . . . $19_{15}$ in the preceding stage, while the outputs of the second counters $23_0$, $23_1$, . . . $23_{15}$ are sent to the linear interpolator 15.

The function of the first embodiment having the above-mentioned composition will be described in the following.

The video signal inputted to the video input terminal 12 is processed by the mean value computer 10 to be outputted as the mean value of the luminance levels of 16 picture elements.

The mean value is inputted to the discriminators $17_0$, $17_1$, . . . $17_{15}$, which correspond to respective luminance levels, in order to be determined whether it corresponds to one of the luminance levels. More particularly, the total of the occurrence frequencies within 1 frame is assumed to be 255, and the luminance level is divided into 16 levels for detection. The discriminator $17_0$ determines whether (the luminance level) corresponds to (either) the level 0 or the level 1; the discriminator $17_1$ determines whether (the luminance level) corresponds to one of the level 0 through the level 2; the same rule applies until it is determined whether (the luminance level) corresponds to one of the 0-level through the level 16. In this way, it is determined whether each of all the luminance levels corresponds to (one of) the level 0 through the level concerned. When the (luminance level) corresponds to (one of the set levels) the occurrence frequency is counted by one of the subsequent first counters $19_0$, $19_1$, . . . $19_{15}$.

The occurrence frequencies counted by the first counters $19_0$, $19_1$, . . . $19_{15}$ are respectively inputted to the one side of the subsequent comparators $21_0$, $21_1$, . . . $21_{15}$. The output from the comparison reference value input terminal 11 is inputted to the other side (of the comparators). Therefore, when the occurrence frequency counted by each of the first counters $19_0$, $19_1$, . . . $19_{15}$ is greater than the comparison reference value, the counting is carried out by the second counters $23_0$, $23_1$, ... $23_{15}$, and the first counters $19_0$, $19_1$, ... $19_{15}$ are cleared.

When the comparison reference value from the comparison reference value input terminal 11 exceeds the number obtained by dividing the number of samples within 1 frame by m, the number of samples used for computing the mean value (of the luminance levels) by the mean value computer 10, the equation given below is used so that the value of the second counter $23_{15}$ (correcting characteristic point) becomes 255 (FFH). Comparison reference value=(Total number of picture elements within 1 frame/m)/FFH=w (Number of picture elements in horizontal direction)×h (Number of picture elements in vertical direction)÷16÷255.

The occurrence frequencies counted by the second counters $23_0$, $23_1$, ... $23_{15}$ are assumed to be as given below.

c0: Occurrence Frequency of the levels within 00–10 (OF: Hexadecimal number system) counted by the second counter $23_0$.

c1: Occurrence Frequency of the levels within 00–20 (1F: Hexadecimal number system) counted by the second counter $23_1$.

cE: Occurrence Frequency of the levels within 00–F0 (EF: Hexadecimal number system) counted by the second counter $23_{15}$.

The occurrence frequencies counted by these second counters $23_0$, $23_1$, ... $23_{15}$ respectively can be outputted as the correcting characteristic points when graphically represented with the luminance levels plotted on the x-axis and the occurrence frequencies plotted on the y-axis as shown in FIG. 8.

The data covering 16 levels obtained by adding each of the occurrence frequencies c0, c1, ... cE to the start point 00 and the total number of occurrence frequencies (a fixed value) is sent to the linear interpolator 15, where the occurrence frequencies 00, c0, c1, ... cE are sequentially connected with segments which are linearly interpolated to obtain a correcting characteristic line consisting of continuous segments.

The image quality corrector 16 processes the video signal inputted from the video signal input terminal 12 for correcting image quality according to the correcting characteristic line provided by the linear interpolator 15 and outputs the corrected video signal from the video signal output terminal 18. More particularly, when the luminance level of the video signal inputted from the video signal input terminal 12 is x, the image quality correction processing is made according to the correcting characteristic line so that the corrected luminance level becomes y and (the corrected video signal) is outputted from the video signal output terminal 18.

According to the first embodiment of the present invention as is described in the foregoing, an optimum correcting characteristic can be obtained based on the occurrence frequency data of each luminance level, whereby the image quality correction processing adapted to the condition of the image can be made.

Further, in the case of the first embodiment, the number of samples for determining the mean value by the mean value computer 10 is 16; the number of frames for obtaining the occurrence frequency data by the occurrence frequency counter is 1; the number of luminance levels is 16, but the present invention is not limited to this case.

According to the first embodiment described above, an optimum correcting characteristic adaptable to the occurrence frequency of each luminance level can be obtained, so that the image correction processing can be made suiting any type of image.

Next, the second embodiment of the present invention will be described referring to FIGS. 9, 10 and 11.

Figure 9:
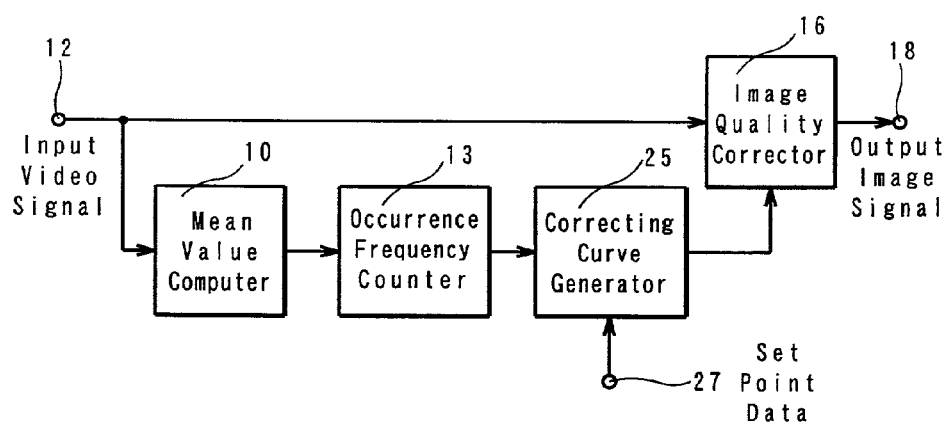
FIG. 9 is a diagram showing the whole of the image quality correcting circuit as the second embodiment of the present invention.

In FIG. 9, the video signal input terminal 12, the mean value computer 10, the occurrence frequency counter 13, the image corrector 16 and the video signal output terminal 18 are similar to those of the first embodiment shown in FIGS. 6 and 7. The second embodiment is characterized by the correcting curve generator 25 inserted between the appearance frequency counter 13 and the image quality corrector 16, the correcting curve generator being designed for generating a new correcting curve according to the occurrence frequency data of the video signal which is obtained based on the video signal inputted to the video signal input terminal 12 and counted by the occurrence frequency counter 13 through the mean value computer 10 and the set point data provided by the set point data input terminal 27.

The correcting curve generator 25 comprises a circuit designed for generating a Bezier curve passing through the start point 00 and the end point TF and based on plural points comprising the occurrence frequency and the set point given alternately.

The function of the second embodiment will be described in the following.

(1) Assume that the video signal inputted to the video signal input terminal 12 has a characteristic causing the occurrence frequency to concentrate about the center similarly to the case of the occurrence frequency distribution of case 1. Unlike the case shown in FIG. 8, as the occurrence frequency data to be provided from the occurrence frequency counter 13, c0, c2, c4, c6, c8, cA, cC and cE corresponding to every other levels 10, 30, 50, 70, 90, B0 and F0 are used. These occurrence frequency data indicate that the occurrence frequencies are at relatively low levels as to c0–c6 and c8–cE, while the occurrence frequencies are at relatively high levels between c6 and c8.

Further, T0, T2, T4, T6, T8, TA, TC and TE corresponding to the levels 00, 20, 40, 60, 80, A0, C0 and E0, which are on the straight line connecting the start point 00 and the end point TF, respectively, are inputted, as set data, to the set data input terminal 27.

Re-arranging these in the order of the luminance level results in T0, c0, T2, c2, T4, c4, T6, c6, T8, c8, TA, cA, TC, cC, TE and cE, which become the correcting line comprising the segments as is shown by a dotted line just like the case of the first embodiment.

Figure 10:
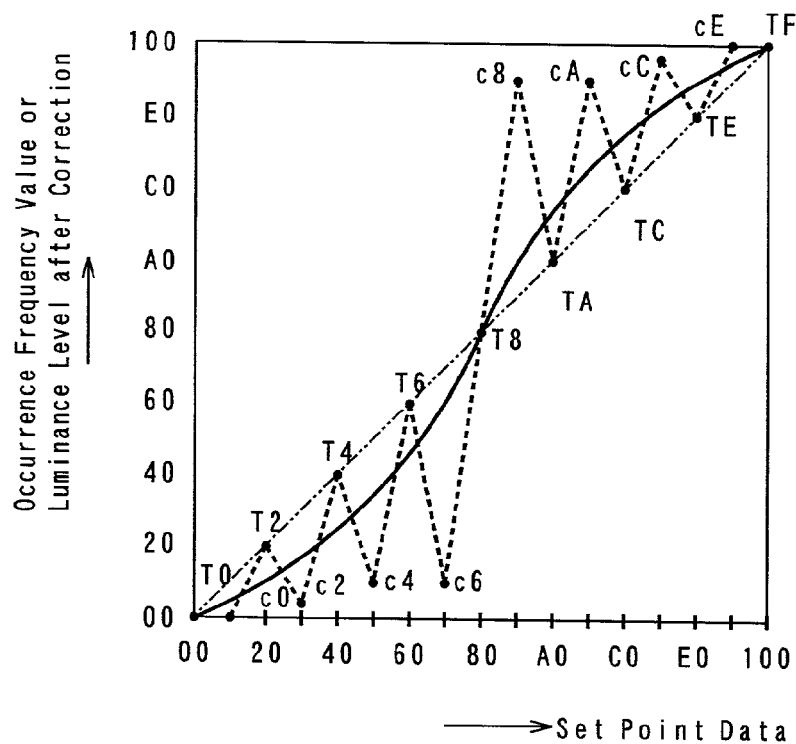
FIG. 10 is a correcting characteristic diagram according to the second embodiment of the present invention.

However, in the case of the second embodiment, when the Bezier curve passing through the start point 00 and end point FF is generated by the correcting curve generator 25 based on the plural points comprising the occurrence frequency points and the set points, which are arranged alternately, it takes an S-shape with its portion representing relatively high (luminance) levels (slightly) swelling upward, while its portion representing relatively low (luminance) levels sagging (slightly) compared with the straight line as is represented by the solid line in FIG. 10.

The image quality corrector 16 processes the video signal inputted from the video signal input terminal 12 in order to correct the image quality according to the correcting curve provided by the correcting curve generator 25 and outputs (the corrected video signal) from the video signal output terminal 18.

(2) Assume that the video signal inputted to the video signal input terminal 12 has a characteristic as is represented by the occurrence frequency distribution pattern 2 characterized by the predominance of relatively low (luminance) levels as is shown in FIG. 2(b). Such a case indicates that occurrence frequencies are small respectively within the ranges of c0–c2 and c4–cE, while the occurrence frequency is relatively large between c2 and c4.

Figure 11:
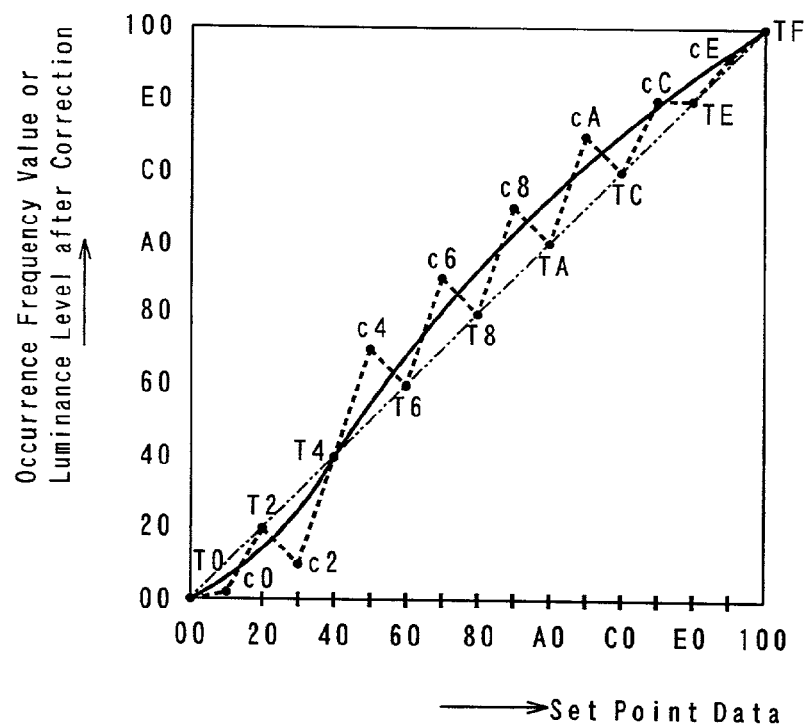
FIG. 11 is another correcting characteristic diagram according to the second embodiment of the present invention.

Similarly to the above case, when the Bezier curve, passing through the start point 00 and the end point TF and generated by the correcting curve generator 25 based on (the set points) re-arranged in the order of T0, c0, T2, c2, T4, c4, T6, c6, T8, c8, TA, cA, TC, cC, TE and cE, is generated, it takes a shape with its portion representing high (luminance) levels being almost straight, while its portion representing low (luminance) levels is slightly saggy as is represented by a solid line shown in FIG. 11 compared with the straight line between the start point 00 and the end point TF.

The image quality corrector 16 processes the video signal inputted from the video signal input terminal 12 to correct the image quality according to the correcting curve provided from the correcting curve generator 25 and outputs the corrected video signal from the video signal output terminal 18.

In the case of the above embodiment, the set point data from the set point data input terminal 27 is sampled from the straight line connecting the start point 00 and the end point TF, but the sampling method is not limited to this case; for instance, as in the case of the characteristic line represented by the solid line in FIG. 10, the contrast between the bright portion and the dark portion of the image can be emphasized by sampling the set points from the S-shape curve including the upwardly swelled portion representing the higher (luminance) levels and the sagging portion representing the lower (luminance) levels, or the contrast between the bright portion and the dark portion can be weakened by using the set points having inverse characteristics.

Further, the present embodiment is not limited to the case where the appearance frequency data and the set point data are arranged alternately; for instance, the appearance frequency data and the set point data may be arranged at a ratio of 2 to 1 to emphasize the video signal data, or both may be arranged at a ratio of 1 to 2 to emphasize the set point data.

As described in the foregoing, according to the second embodiment of the present invention, the optimum correcting characteristic can be obtained according to the appearance frequency data for each (luminance) level to make image quality correction processing applicable to any kind of image. Further, by selecting any given points of a correcting characteristic curve, the characteristic curve can be varied according to the purpose or preference.

Next, an image quality correcting circuit as the third embodiment will be described referring to FIGS. 8 through 12.

Figure 12:
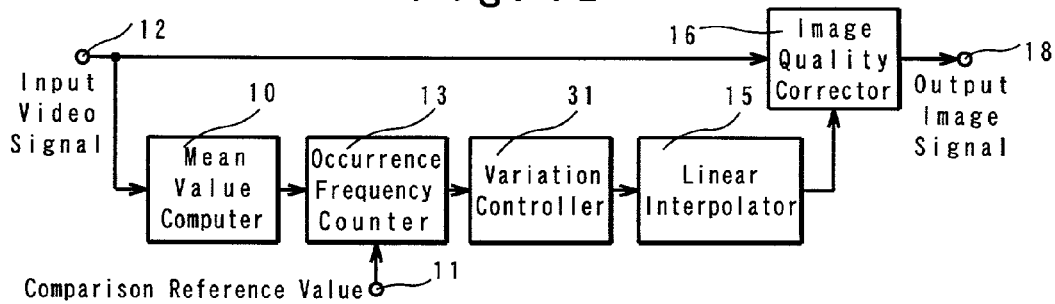
FIG. 12 is a block diagram showing the whole of the image quality correcting circuit as the third embodiment of the present invention.

In FIG. 12, those parts common to those shown in FIG. 6 are assigned common numerals and letters and thus the descriptions thereof are omitted here.

In FIG. 12, 12 denotes the video signal input terminal; 10, the mean value computer; 13, the occurrence frequency counter; 11, reference value input terminal; 15, linear interpolator; 16, image quality corrector; 18, video signal output terminal; 31, variation controller.

The variation controller 31 comprises the 15 variation controllers $31_0, 31_1, \ldots 31_{14}$; the variation controller $31_0$ comprises the (difference detectors) $33_0$, constant multiplier $35_0$, adder $37_0$ and N-frame delayer $39_0$; the variation controller $31_1$, comprises the (difference detectors) $33_1$, constant multiplier $35_1$, adder $37_1$ and N-frame delayer $39_1$, and others comprise similar parts; the variation controller $31_{14}$ comprises the (difference detector) $33_{14}$, constant multiplier $35_{14}$, adder $37_{14}$ and N-frame delayer $39_{14}$.

The (difference detectors) $33_0, 33_1, \ldots 33_{14}$ output the differences between the occurrence frequencies (counted values) outputted from the second counters $23_0, 23_1, \ldots 23_{14}$ and the output values of N-frame delayers $39_0, 39_1, \ldots 39_{14}$; the constant multipliers $35_0, 35_1, \ldots 35_{14}$ multiplies the output values of the difference detectors $33_0, 33_1, \ldots 33_{14}$ by the coefficient 1/X (X=an integer of 2 or more, e.g., X=2) to output the product; the adders $37_0, 37_1, \ldots 37_{14}$ and the output values of the constant multipliers $35_0, 35_1, \ldots 35_{14}$ to the output values of the N-frame delayers $39_0, 39_1, \ldots 39_{14}$; the N-frame delayers $39_0, 39_1, \ldots 39_{14}$ not only delay the sums obtained by the adders $37_0, 37_1, \ldots 37_{14}$ by N frames for output to the difference detectors $33_0, 33_1, \ldots 33_{14}$ and the adders $37_0, 33_1, \ldots 33_{14}$ but also output to the linear interpolator 15. The occurrence frequency to be outputted from the second counter $23_{15}$ in the appearance counter 13 is directly outputted to the linear interpolator 15 without using the variation controller 13.

The function of the third embodiment having the above composition will be described referring to FIG. 14 and FIG. 8.

N may be any integer of 1 or more, m, any integer of 2 or more, X, any integer of 2 or more, but, for convenience, the explanation will be made as to the cases where N=1, m=16 and X=2.

(1) The video signals inputted to the video signal input terminal 12 are processed by the mean value counter 10 and outputted sequentially as the mean values of every 16 luminance levels.

(2) When the mean value computed by the mean value computer 10 is inputted to the occurrence frequency counter 13, the occurrence frequency counter 13 functions similarly to the case of the first embodiment shown in FIGS. 6 and 7.

For the convenience of explanation, assume that the occurrence frequencies outputted from the second counters $23_0, 23_1, \ldots 23_{15}$ are c0, c1, ... cE, and cF respectively. In this case, c0, c1, ... cE and cF represent the occurrence frequencies given below.

c0: Occurrence frequency counted by the second counter $23_0$ within the level range of 00–10 (10 is a hexadecimal).

c1: Occurrence frequency counted by the second counter $23_1$ within the level range of 00–20 (20 is a hexadecimal). . . .

cE: Occurrence frequency counted by the second counter $23_{14}$ within the level range of 00–F0 (F0 is a hexadecimal).

cF: Occurrence frequency (constant value) counted by the second counter $23_{15}$ within the level range of 00–100 (100 is a hexadecimal).

(3) Upon receipt of the 16-level data comprising the occurrence frequencies c0, c1, . . . cF outputted from the second counters $23_0, 23_1, \ldots 23_{15}$ and the data of the start point 00 added thereto, the variation controller 31 controls the variation of each of the occurrence frequencies c0, c1, . . . cE and cF during 1 frame period (case where N=1) to the variation during plural-frame periods (an example of plural times of N frame) for output, provided that cF will not vary, since it is a constant value.

For instance, assuming that the appearance frequency c0 of the second counter $23_0$ becomes [2], [2], [2], [2], [2], [16], [16], [16], [16], [16] and [16] as shown in FIG. 14(a) and varies abruptly to [16] from [2] during the frame period FT near the point t6, as shown in (b) of the same figure, owing to the control function of the variation controller 31, the appearance frequency varies from [2] to [9] during the 1-frame period FT immediately following the point t7, the point coming after the lapse of 1-frame period FT from point t6, and further varies to [13], [15] and [16] respectively during the 1-frame periods immediately following the points t8, t9 and t10 until converging to [16]. That is, a rapid variation during a single frame period is controlled to more gentle variations ranging over a 4-frame period.

The control function of the variation controller 31 will be explained dividing it into the following paragraphs 1 through 5 and with reference to the circuit diagram shown in FIG. 13.

For convenience of explanation, assume that the occurrence frequency (correcting characteristic point) of the second counter $23_0$ is P0, and the occurrence frequency (correcting characteristic point) of the N-frame delayer 390 is PD0.

Figure 14:
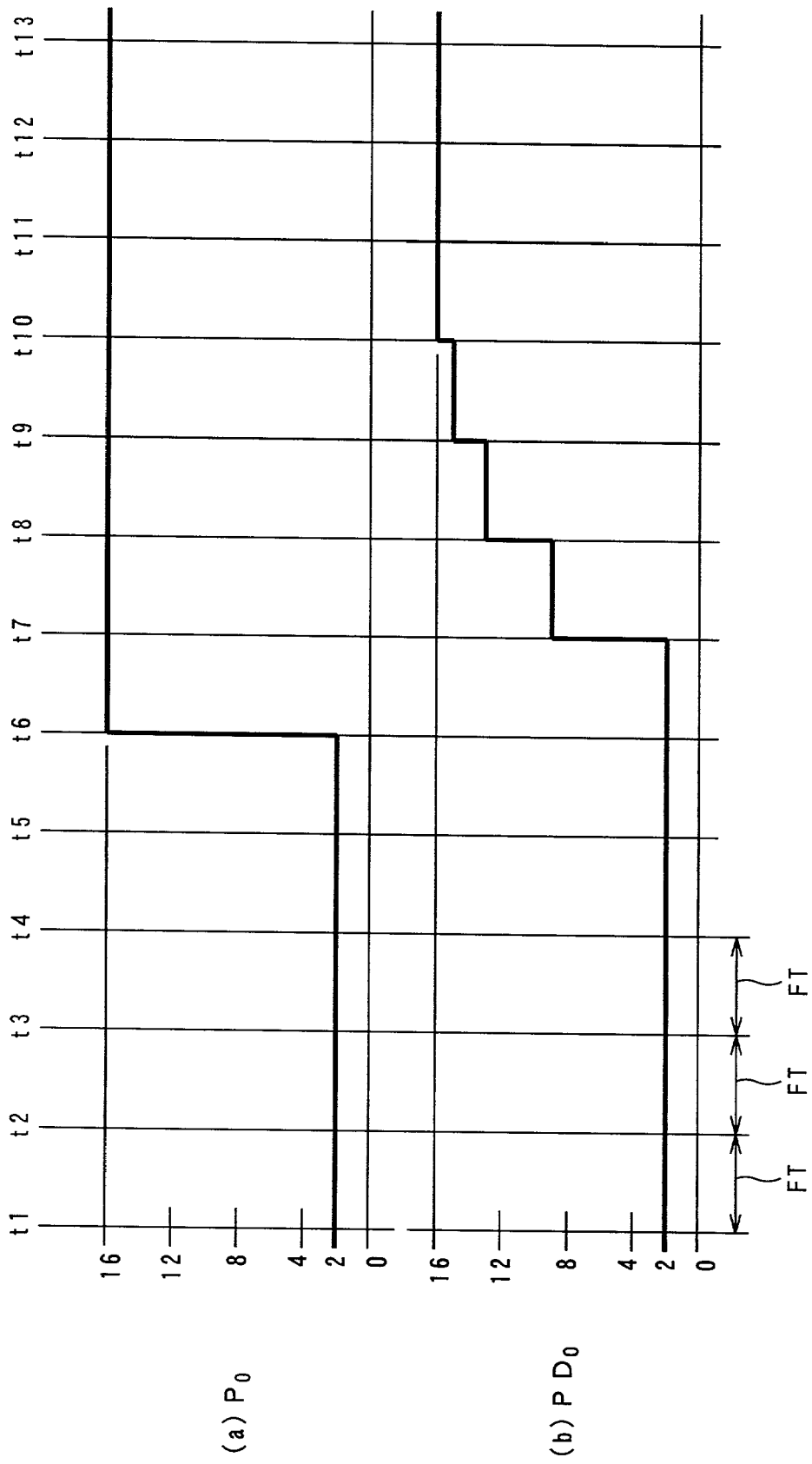
FIG. 14 is a time chart illustrating the function of the variation controller $31_0$ shown in FIG. 13.

① As shown in FIG. 14(*a*), assuming that the P0 has varied to [16] from [2] during the 1-frame period FT at around the point t6, P0=16 and PD0=2 during this 1-frame period FT, and so the occurrence frequency outputted from the variation controller $31_0$ becomes [2].

In this case, the output (P0–PD0) of the difference detector $33_0$ becomes 14(=16−2); the output {(P0–PD0)×½} of the constant multiplier 350 is 7(=14/2); the output {PD0+(P0–PD0)½} of the adder $37_0$ is 9(=2+7).

② During the 1-frame period near the point t7 immediately following the laps of the 1-frame period Ft from the point t6, the data obtained by delaying by 1 frame the output of the adder $37_0$ becomes the output (i.e., PD0) of the N-frame delayer $39_0$, so that the occurrence frequency outputted from the variation controller $31_0$ becomes [9].

In this case, the output (P0–PD0) of the difference detector $33_0$ is 7(=16−9); the output {(P0–PD0)×½} of the constant multiplier $35_0$ is 4 (=7/2 with decimals rounded off); the output {PD0+(P0–PD0)×½} is 13 (=9+4).

③ During the 1-frame period FT immediately following the point t8 after the lapse of 1-frame period from the point t7, similarly to the case of the paragraph 2, the occurrence frequency outputted from the variation controller $31_0$ becomes 13.

In this case, the output of the adder $37_0$ becomes 15(=13+2), similarly to the case described in the above paragraph 2).

④ During the 1-frame period FT immediately following the point t9 after the lapse of the 1-frame period TF from the point t8, similarly to the case described in the above paragraph ②, the appearance frequency outputted from the variation controller $31_0$ becomes 15.

In this case, the output of the adder $37_0$, similarly to the case described in the above paragraph ②, becomes 16 (=15+1).

⑤ During the 1-frame period FT immediately following the point t10 after the lapse of the 1-frame period FT from the point t9, the occurrence frequency outputted from the variation controller $31_0$ becomes [16] similarly to the case described in the above paragraph ②.

In this case, the output of the adder $37_0$ becomes 16 (16+0) similarly to the case described in the above paragraph ②.

(4) The variations of the appearance frequencies c1, . . . cE of other second adders $37_0$ are also made gentler for output because of the controlling effect of the variation controller 31.

Figure 13:
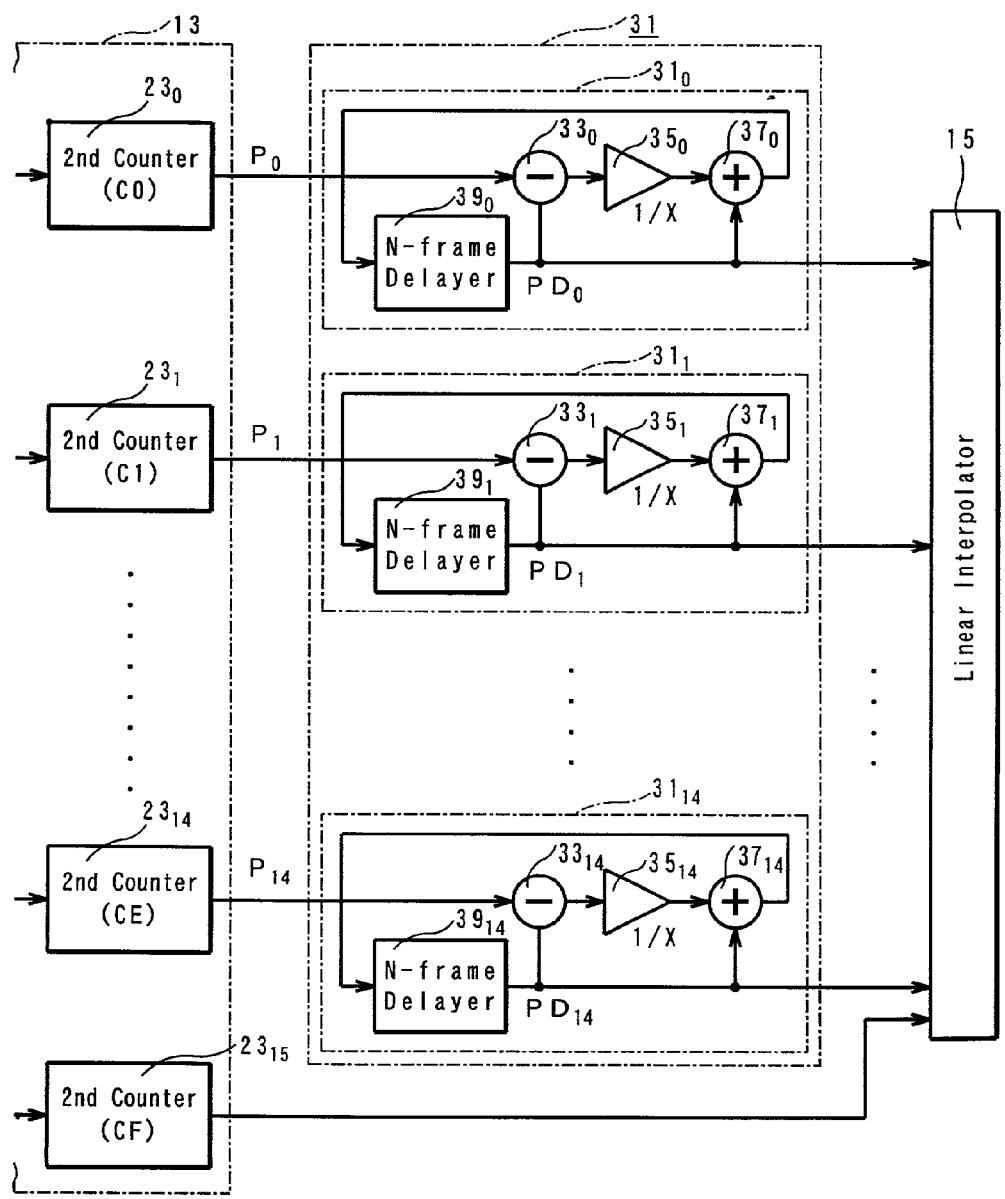
FIG. 13 is a block diagram showing the detail of the variation controller 31 shown in FIG. 12.

Applying the above case to the circuit shown in FIG. 13, the appearance frequencies of the second counters $23_1$, . . . $23_{14}$ become P1 (=c1), . . . P14 (=cE), and, when the output values of the N-frame delayers $39_1$, . . . $39_{14}$ become PD1, . . . PD14, and the P1, . . . P14 vary sharply during a certain 1-frame period, the variations of the corresponding PD1, . . . PD14 are controlled to milder variations during plural-frame period.

(5) When the variations of the appearance frequencies c0 (=P0), c1 (=P1), . . . cE (=P14) of the second counters $23_0$, $23_1$, $23_{14}$ controlled to milder variations are sent to the linear interpolator 15, the linear interpolator 15 linearly interpolates the variations by sequentially connecting the controlled appearance frequencies 00, c0, c1, . . . cE and cF with a straight line to generate a correcting characteristic line.

Figure 8:
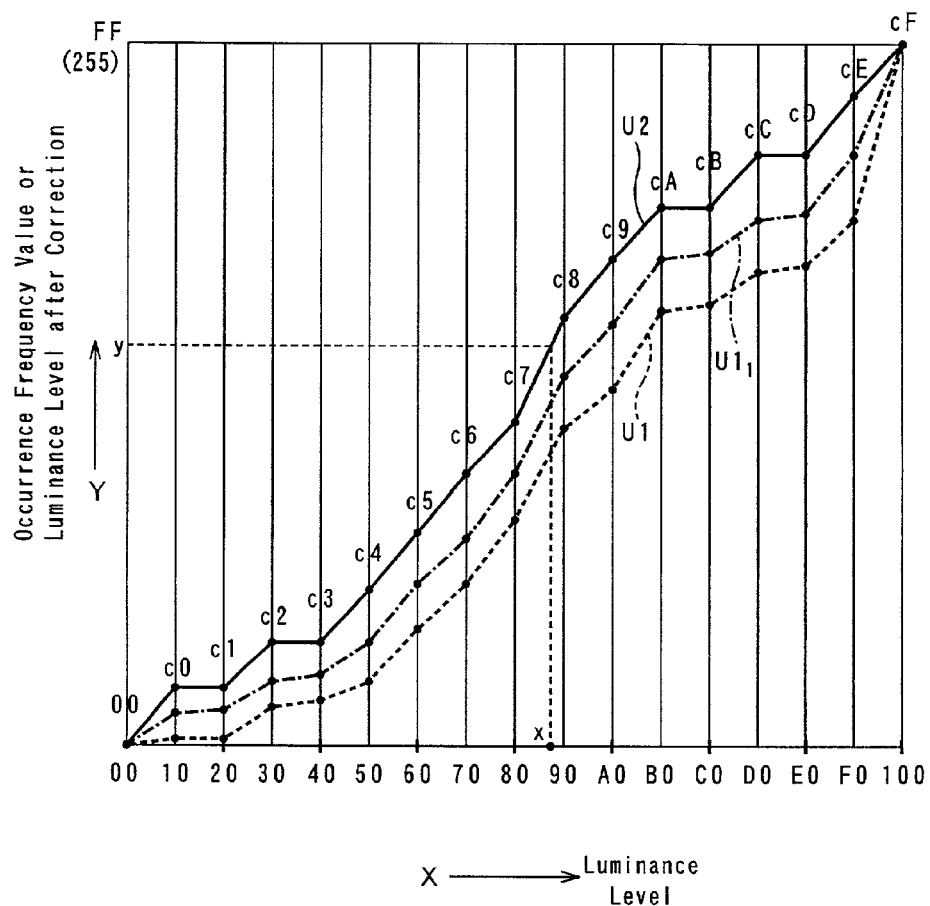
FIG. 8 is a correcting characteristic line diagram of the first embodiment of the present invention.

For instance, comparing with a case where the correcting characteristic line obtained by the conventional linear interpolator, not provided with the variation controller 31, as is shown in FIG. 6 has varied abruptly, just like the case of the correcting characteristic line U1 indicated by a dotted line and the correcting characteristic line U2 indicated by a solid line shown in FIG. 8, during 1-frame period, in the case of the circuit provided with the variation controller 31 according to the present invention, the variation from the correcting characteristic line U1 to the similar line U2 can be made more gently over a plural-frame period.

That is, since the variations of the appearance frequencies of c0, c1, . . . cE become gentler owing to the function of the variation controller 31, the correcting characteristic line generated by the linear interpolator 15 varies gently over a plural-frame period (e.g., period ranging over 4–6 frames) and converges to U2.

In this case, the appearance frequency c0 varies gently ranging over a 4-frame period as described in the parts 1–5, while the appearance frequencies c1, . . . cE vary gently ranging over a 4-frame period or over plural ranges other than 4 frames (e.g., 5 or 6 frames) depending on the amount of variation.

In FIG. 8, the correcting characteristic line U1 corresponds to the correcting characteristic line ranging from the point t6 to the point t7, the point after the lapse of 1-frame period from the point t6, and the c0 (the appearance frequency by the second counter $23_0$) on this correcting characteristic line U1 corresponds to [9] described in the above paragraph ②.

(6) The image quality corrector 16 processes for image quality correction the video signal inputted from the video signal input terminal 12 according to the correcting characteristic line and outputs (the corrected video signal) from the video signal output terminal 18. More specifically, when the luminance level of the video signal inputted from the video signal input terminal 12 is x, the image quality correction processing is made according to the correcting characteristic line so that the luminance level is corrected to y, and (the corrected video signal) is outputted from the video signal output terminal 18.

According to the third embodiment of the present invention, not only the image quality correction processing can be made according to the optimum correcting characteristic based on the appearance frequency of the luminance level of each picture element within N frames but also the image quality correction without image quality deterioration can be made preventing a large variation of the luminance level appearance frequency distribution occurring at the time of the switching of the image or during the display of the moving image.

Next, the image quality correcting circuit as the fourth embodiment of the present invention will be described referring to FIG. 15.

Figure 15:
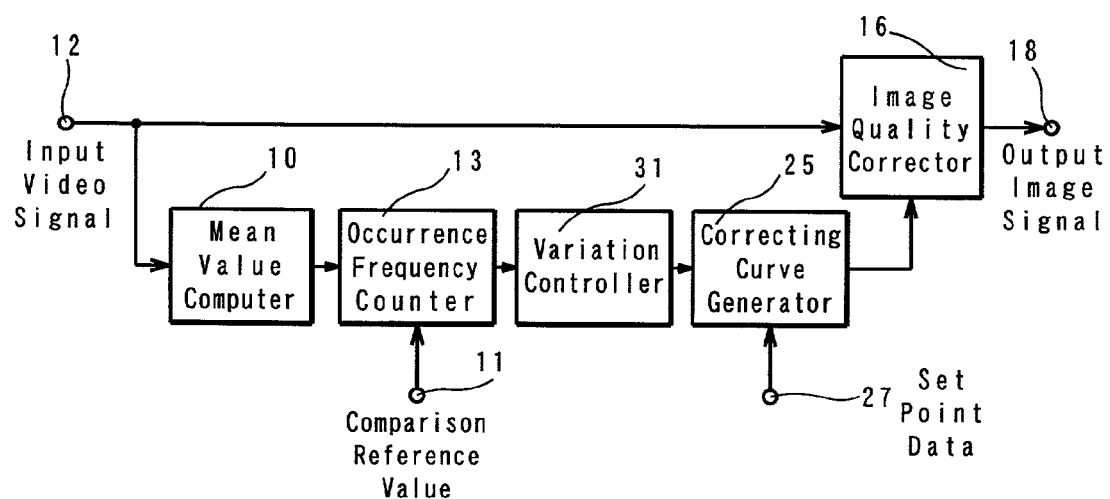
FIG. 15 is a block diagram showing the whole of the image quality correcting circuit as the fourth embodiment of the present invention.

In FIG. 15, the video signal input terminal 12, the mean value computer 10, the appearance frequency counter 13, the image quality corrector 16, the video signal output terminal 18 and the variation controller 31 are similar to those of the embodiment 3 shown in FIG. 12 and FIG. 13. The fourth embodiment is characterized by that a correcting curve generator 25 provided replacing the linear interpolator 15 shown in FIG. 12.

The correcting curve generator 25, inserted between the variation controller 31 and the image quality corrector 16, is designed to generate a new correcting curve based on the occurrence frequency, which is counted by the occurrence frequency counter 13 and whose variation is controlled by the variation controller 31, and the set point data, which is provided from the set point data input terminal 27.

The correcting curve generator 25 is, for example, composed of a circuit designed for generating a Bezier curve passing through the start point 00 and the end point TF based on plural points representing the occurrence frequency and set points arranged alternately.

The function of the fourth embodiment will be explained referring to FIGS. 2, 9, 10 and 11.

(1) Assume that the (luminance level) occurrence frequencies of the video signals inputted to the video signal input terminal 12 tend to concentrate almost around the mean value as is represented by the frequency distribution and shown in FIG. 2(a).

As the occurrence frequencies by the occurrence frequency counter 13, c0, c2, c4, c6, c8, cA, cC and cE are used corresponding to the (luminance) levels 10, 30, 50, 70, 90, B0, D0 and F0 which are arranged by skipping every next level similarly to the case of the second embodiment shown in FIG. 2.

T0, T2, T4, T6, T8, TA, TC and TE respectively corresponding to the levels 00, 20, 40, 60, 80, A0, C0 and E0 on the straight line connecting the start point 00 and end point TF are inputted, as the set data, from the data input terminal 27.

In the conventional case where the variation controller 31 is not provided as shown in FIG. 9, the S-shape correcting curve V (Bezier curve), as is shown by a solid line in FIG. 10, is provided, by the correcting curve generator 25, based on the plural points consisting of the occurrence frequency data: c0, c2, c4, c6, c8, cA, cC and CE, and set point data: T0, T2, T4, T6, T8, TA, TC and TE, which are arranged alternately; in such a case, when the occurrence frequencies c0, c2, c4, c6, c8, cA, cC and cE respectively vary sharply, the correcting curve also varies abruptly from the correcting curve V1 to the correcting curve V2 (V1 and V2, not shown).

However, in the case of the embodiment provided with the variation controller 31 shown in FIG. 15, the variations of the occurrence frequencies of the c0, c2, c4, c6, c8, cA, cC and cE during 1 frame are controlled to gentler variations ranging over a plural-frame period, so that the correcting curve V to be generated by the correcting curve generator 25 vary gradually as V1, V1$_1$, V1$_2$, . . . , V2 frame by frame until converging to V2 (V1$_1$, V1$_2$, not shown).

The image quality corrector 16 processes, for image quality correction, the video signal inputted from the video signal input terminal 12 and outputs the corrected video signal from the video signal output terminal 18.

(2) Assume that the video signals inputted to the video signal input terminal 12 has a (luminance level) occurrence frequency distribution pattern 2 characterized by the concentration within a low level range.

Similarly to the case described in the above paragraph (1), in the case of the second embodiment not provided with the variation controller 31, a correcting curve W (Bezier curve) is generated by the correcting curve generator 25 based on the plural points consisting of the appearance frequency data: c0, c2, c4, c6, c8, cA, cC and cE and set point data: T0, T2, T4, T6, T8, TA, TC and TE, which are arranged alternately, and, when the appearance frequencies c0, c2, c4, c6, c8, cA, cC and cE respectively vary sharply, the correcting curve W also varies sharply from W1 to W2 (W1 and W2, not shown).

However, in the case of the fourth embodiment provided with the variation controller 31, the variations of the occurrence data: c0, c2, c4, c6, c8, cA, cC and cE during 1-frame period are controlled to the gentler variations ranging over the plural-frame period, so that the correcting curve W also varies gradually from W1, W1$_1$, W1$_2$, . . . W2 through each single-frame period until converging to W2 (W1$_1$, W1$_2$, not shown).

The image quality corrector 16 processes, for image quality correction, the video signal inputted from the video signal input terminal 12 according to the correcting curve generated by the correcting curve generator 25 and outputs the corrected video signal from the video signal output terminal 18.

In the case of the fourth embodiment, the set point data from the set point data input terminal 27 is sampled from the straight line connecting the start point 00 and the end point TF, but not limited to such a sampling; for example, the set point data may be sampled from the S-shape curve with a portion slightly swelling upward by representing the high levels and a saggy portion representing the low levels, as is given by a solid line in FIG. 10, in order to emphasize the contrast between the brightness and the darkness or in order to weaken the contrast between the brightness and the darkness by sampling the set points having inverse characteristics.

Further, the present embodiment is not limited to the case where occurrence frequency data and the set point data are arranged alternately; the data of the video signal may be emphasized by setting the ratio between the occurrence frequency data and the set point data for 2 to 1, or the set point data may be emphasized by setting the ratio for 1 to 2 or any other ratio.

According to the fourth embodiment described in the foregoing, not only the image quality correction processing can be accomplished according to the optimum correcting characteristic based on the occurrence frequency corresponding to each (luminance) level but also the image quality correction processing can be accomplished without entailing the image quality deterioration even when the occurrence frequencies of luminance levels of the picture elements vary largely. Further, the extreme variation of the correcting curve can be prevented by selectively using the correcting characteristic, or the correcting curve can be varied according to the purposes or preferences.

Concerning the third embodiment and the fourth embodiment, the cases where the mean value computer is provided in order to simplify the composition of the occurrence frequency counter have been explained, but these embodiments are not limited to these cases; these embodiments are also applicable to the cases where the mean value computer is omitted.

The image quality correcting circuit as the fifth embodiment of the present invention will be explained referring to FIG. 16 and FIG. 17.

Figure 16:
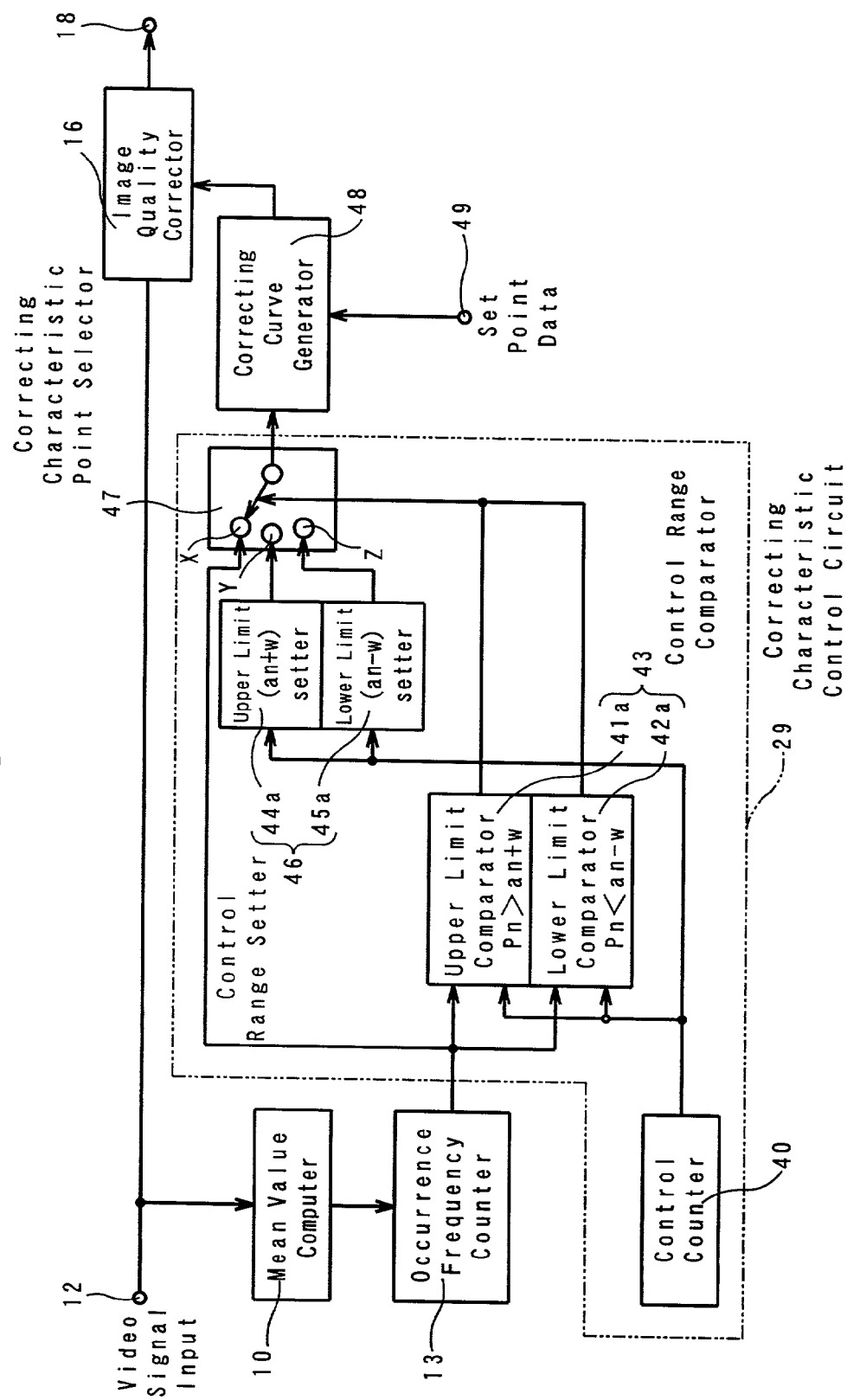
FIG. 16 is a block diagram showing the whole of the image quality correcting circuit as the fifth embodiment of the present invention.

In FIG. 16, numeral 12 denotes the video signal input terminal whereto the video signal is to be inputted; 10, the mean value computer for computing the mean value of the values at m number (m=integer of 2 or more) of points; 13, the occurrence frequency counter for sequentially counting the occurrence frequencies set to different values beginning from 0 level and ranging to N number (any integer of 1 or more) of frames; 29, the correcting characteristic point control circuit for controlling the correcting characteristic point by setting the upper limit value (an+w) and the lower limit value (an−w); 48, the correcting curve generator for generating the correcting curve according to the controlled correcting characteristic points; 49, set point data input terminal for inputting the set point data; 16, the image quality corrector for correcting the image quality according to the generated correcting curve; 18, the video signal output terminal for outputting the corrected video signal.

The correcting characteristic point control circuit 29 comprises a control range comparator 43, a control range setter 46, a control counter for specifying the order of processing and a correcting characteristic point selector 47; the control range comparator 43 comprises the upper limit comparator 41a for comparing the uncorrected correcting characteristic point data (Pn) with the upper limit value (an+w) at that characteristic point and the lower limit comparator 42a for comparing the Pn with the lower limit value (an−w) at that characteristic point; the control range setter 46 comprises an upper limit setter 44a for setting the upper limit value (an+w) and a lower limit setter 45a for setting the lower limit value (an−w); the correcting characteristic point selector 47 is a circuit for selecting the terminal x for Pn of the occurrence frequency counter 13, the terminal y for the upper limit value (an+w) of the upper limit setter 44a and the terminal z for the lower limit value (an−w) of the lower limit setter 45a.

Figure 17:
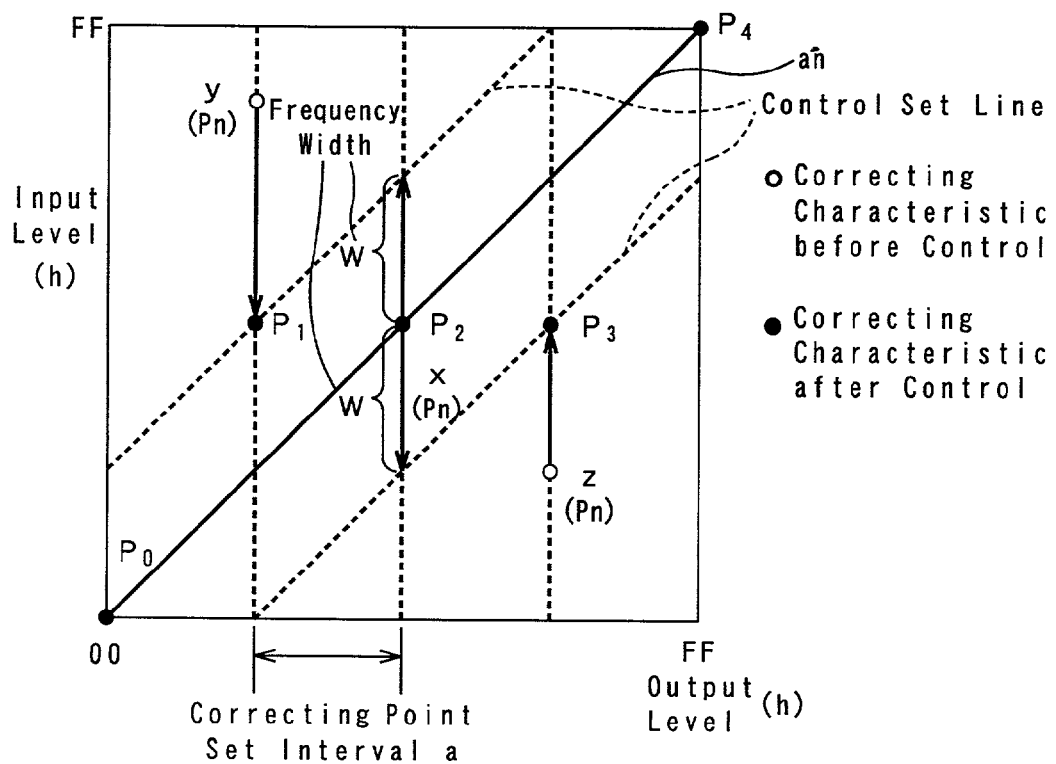
FIG. 17 is a correcting characteristic line diagram according to the fifth embodiment of the present invention.

In this case, as shown in FIG. 17, the straight line, connecting the start point and the end point in rectangular coordinates with its x-axis representing the output level of the luminance and its y-axis representing the input level of the luminance, represents an ideal correcting characteristic line in the case where there is no deviation with respect to the occurrence frequencies of the input levels of the inputted video signals, wherein w represents a certain distribution range around the ideal characteristic line. However, an+w and an−w respectively represent the control set lines representing the upper limit and the lower limit having certain extent lying parallel to the ideal straight line, as shown by the dotted lines in FIG. 17.

The function of the fifth embodiment having the above-mentioned compositions will be explained.

The video signals inputted to the video signal input terminal 12 are processed by the mean value computer 10 for computing the mean values of the luminance levels of every 16 picture elements at various points, which are to be output sequentially.

This mean value is found on the assumption that the total number of the occurrence frequencies within N number (N=any integer of 1 or more) be 255 and there are 16 different luminance levels. The detected mean values are counted by the occurrence frequency counter.

The uncontrolled correcting characteristic point data Pn from the occurrence frequency counter 13 in inputted not only to the contact x of the correcting characteristic point selector 47 but also inputted to the one side of the subsequent upper limit comparator 41a and that of the lower limit comparator 42a as an input. Further, the upper limit value an+w and the lower limit value an−w respectively corresponding to the numbers of the correcting characteristic point data Pn from the control counter 40 are inputted to the other sides of the upper limit comparator 41a and the lower limit comparator 42a respectively. Therefore, when Pn>an+w, the upper limit comparator 41a outputs the signal for switching to the contact y of the correcting characteristic point selector 47, and, when Pn<an−w, the lower limit comparator 42a outputs the signal for switching to the contact z of the correcting characteristic selector 47.

For instance, in the case shown in FIG. 17, since Pn>an+w where Pn is at an extremely high point y, the switching signal is outputted from the upper limit comparator 41a to switch the contact of the correcting characteristic point selector 47 to the contact y and the an+w from the upper limit setter 44a is outputted to the correcting curve generator 48. The correcting curve generator 48 generates a corrected correcting curve on the upper limit set line P1 shown in FIG. 17 according to the an+w outputted from the upper limit setter 44a to serve as an address and the set point data inputted from the set point data input terminal 49, and the corrected correcting curve is outputted to the image quality corrector 16. The video signal inputted from the video signal input terminal 12 is corrected by the image quality corrector 16 according to the correcting curve, and the corrected video signal is outputted to the output terminal 18. As discussed in the foregoing, the deterioration of the image quality can be prevented by controlling the point y whose distribution of occurrence frequencies has some dispersion within a set range.

Further, in the case shown in FIG. 17, since Pn<an−w where Pn is at an extremely low input level point z, the switching signal is outputted from the lower limit comparator 42a to switch the contact of the correcting characteristic point selector 47 to the contact z, and the an−w from the lower limit setter 45a is outputted to the correcting curve generator 48. The correcting curve generator 48 generates a corrected correcting curve on the point P3 the lower limit setting line shown in FIG. 17 according to the output an−w to serve as an address from the lower limit setter 45a and the set point data inputted from the set point data input terminal 49, and the corrected correcting curve is outputted to the image quality corrector 16. The image quality corrector 16 corrects the video signal inputted from the video signal input terminal 12 according to the corrected correcting curve, and the corrected video signal is outputted to the output terminal 18. As discussed above, the deterioration of the image quality can be prevented by controlling the z point whose distribution of occurrence frequency is dispersed within a set range.

Further, since an+w≧Pn≧an−w where Pn is at the z point between the upper limit value and the lower limit value, the switching signal from the upper limit comparator 41a and the lower limit comparator 42a will not be outputted, and the Pn from the occurrence counter 13 is outputted to the correcting curve generator 48. The correcting curve generator 48 outputs the uncorrected correcting circuit curve to the image quality corrector 16, and the video signal from the video signal input terminal 12 outputs the uncorrected video signal to the output terminal 18.

As described in the foregoing, according to the fifth embodiment of the present invention, the generation of the correcting characteristic line having an extreme inclination and the image quality deterioration due to the inclination of the occurrence frequency can be prevented to obtain an optimum correcting characteristic.

Next, the sixth embodiment of the present invention will be described referring to FIG. 18 and FIG. 19.

In the case of the fifth embodiment, regardless of the various correcting characteristic points, the range of the upper limit value+w and the limit of the lower limit value−w are assumed to be fixed.

In contrast, in the case of the sixth embodiment, in computing the correcting characteristic point based on the occurrence frequency of the input level of the video signal within N number of frames, the upper limit range and the lower limit range are set for each correcting characteristic point.

The sixth embodiment will be described in detail.

Figure 18:
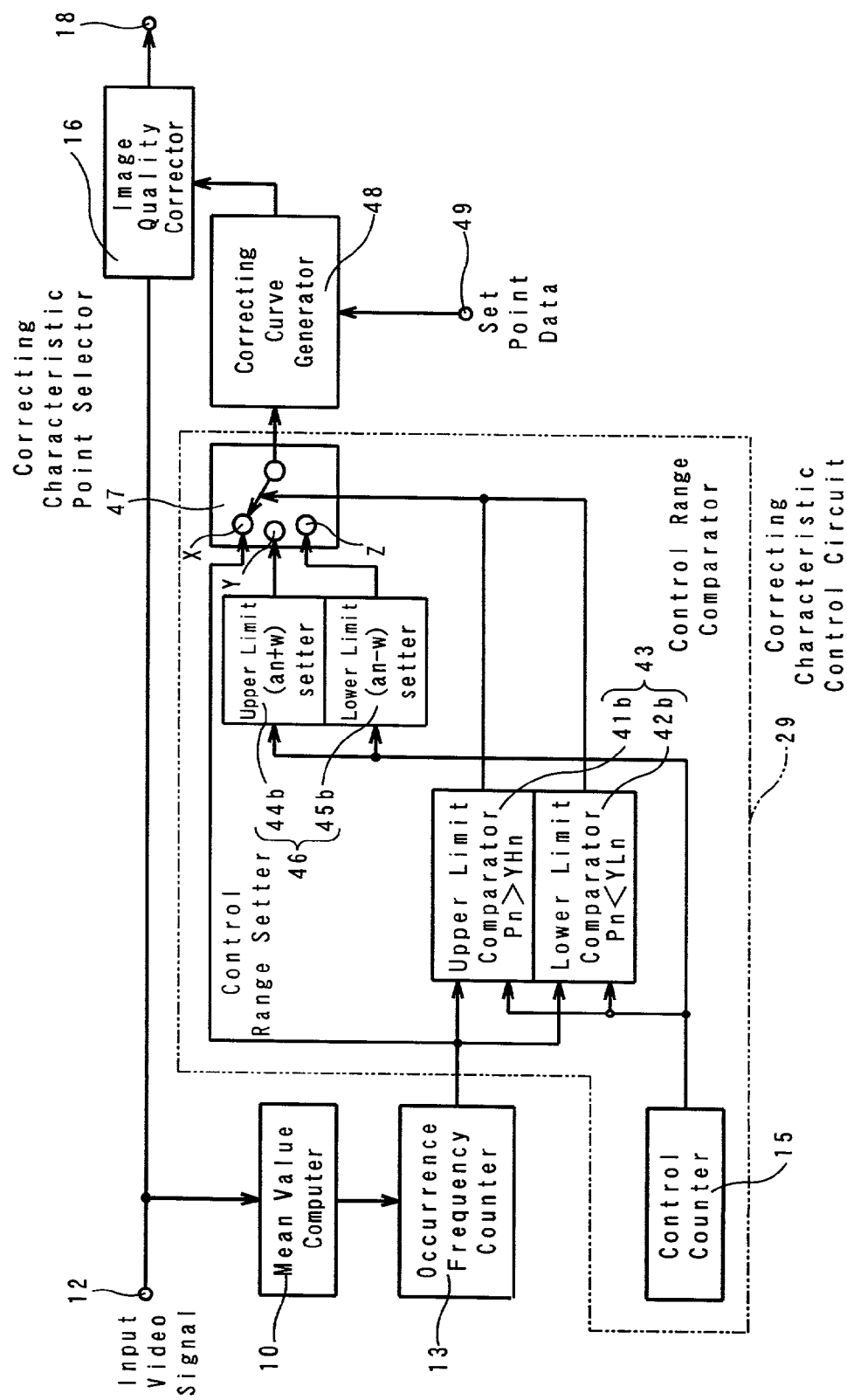
FIG. 18 is a block diagram showing the image quality correcting circuit as the sixth embodiment of the present invention.

In FIG. 18, the video signal input terminal 12, the mean value computer 10, the occurrence frequency counter 13, the image quality corrector 16, the video signal output terminal 18, the correcting curve generator 48 and the set point data input terminal 49 are similar to those in the case of the fifth embodiment. On the other hand, as shown in FIG. 19, the second embodiment is characterized by the generation of a quadratic curve according to the correcting characteristic points representing the upper limit value YHn and the lower limit value YLn being 0 respectively at the start point 0, the upper limit value YHn increasing gradually with respect to the straight line an until the intermediate position, and the lower limit value YLn decreasing gradually with respect to the straight line an to pass the end point FF again. As described in the foregoing, the straight line an connects the start point and the end point FF in the correcting characteristic diagram and represents an ideal correcting characteristic line where the occurrence frequencies of the input levels of the inputted video signals are free of the inclination.

The function of the sixth embodiment will be described in the following.

Figure 19:
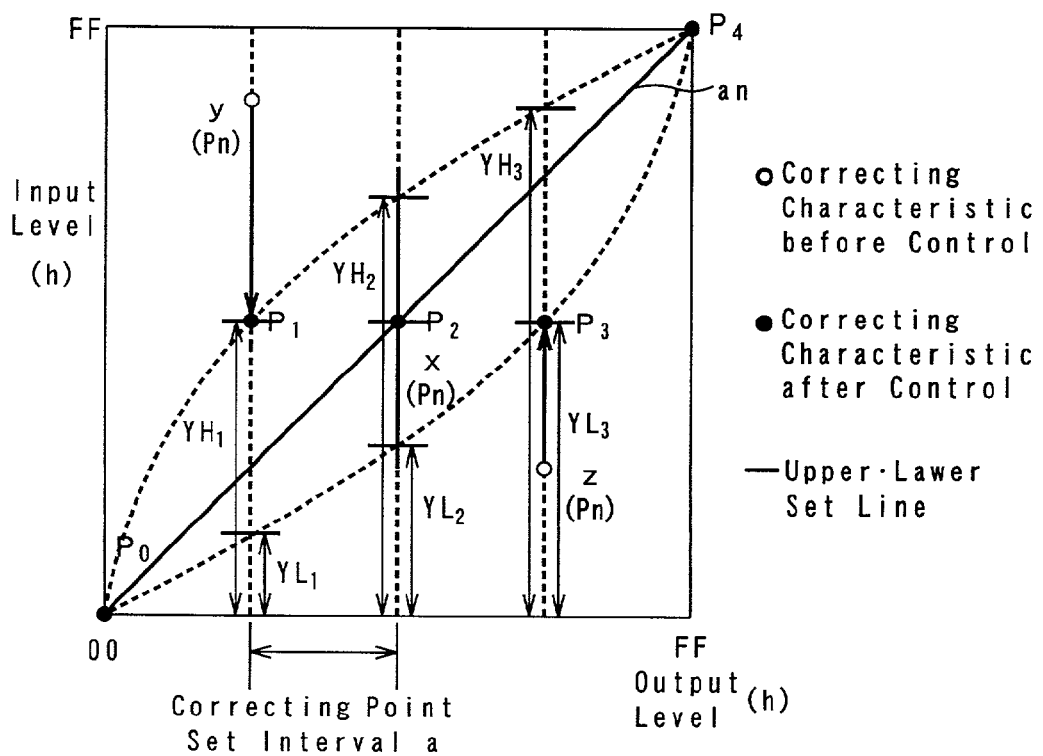
FIG. 19 is a correcting characteristic line diagram according to the sixth embodiment of the present invention.

For instance, in the case shown in FIG. 19, since Pn>YH1 where the uncontrolled correcting characteristic point data Pn from the occurrence frequency counter 13 is at an extremely high input level point y, the switching signal is outputted from the upper limit comparator 41b to switch the contact of the correcting characteristic point selector 47 to the contact y, and the YH1 from the upper limit comparator 44b is outputted to the correcting curve generator 48. The correcting curve generator 48 generates a corrected correcting curve at the point P1 of the upper limit set line, shown in FIG. 19, according to the output, serving as an address, of the upper limit setter 44b and based on the set point data inputted from the set point data input terminal 49 and outputs the corrected correcting curve to the image quality corrector 16. The image quality corrector 16 corrects the video signal from the video signal input terminal 12 according to the correcting curve and outputs the corrected video signal to the output terminal 18. In this way, the deterioration of the image quality is prevented by controlling the point y, whose distribution of occurrence frequency is inclined, within the set range.

Further, in the case shown in FIG. 19, since Pn<Y13 where Pn is at the point z, at which the input level is extremely low, the switching signal is outputted from the lower limit comparator 42b to switch the contact of the correcting characteristic selector 47 to the contact z, and the YL3 from the lower limit setter 45b is outputted to the correcting curve generator 48. The correcting curve generator 48 generates a corrected correcting curve at the point P3 on the lower limit set line, shown in FIG. 19, according to the output, serving as an address, from the lower limit setter 45b and based on the set point data inputted from the set point data input terminal 49 and outputs the corrected correcting curve to the image quality corrector 16. The image quality corrector 16 corrects the video signal from the video signal input terminal 12 according to the corrected correcting curve and output the corrected video signal to the output terminal 18. In this way, the deterioration of the image quality is prevented by controlling the z point, whose distribution of occurrence frequency is inclined, within the set range.

Further, since YH2≦Pn≦YL2 where the Pn is at point x between the upper limit value and the lower limit value, the switching signal will not be outputted from the upper limit comparator 41a and the lower limit comparator 42a, and the Pn from the occurrence frequency counter 13 is outputted to the correcting curve generator 48. The correcting curve generator 48 outputs an uncorrected correcting curve to the image quality corrector 16, and the video signal from the video signal input terminal 12 is outputted to the output terminal 18 without being corrected.

As described in the foregoing, according to the sixth embodiment, the optimum correcting characteristic adapted to the appearance frequency data of each level, and image quality correction processing suiting any kind of image can be made available. Further, according to this embodiment, not only an extreme variation of the correcting curve can be prevented according to correcting characteristic point but also the correcting curve can be varied either intentionally or by the preference.

Further, in the cases of the fifth embodiment and the sixth embodiment, the number of samples for obtaining the mean value to be computed by the mean value computer 10 is set to 16, the number of frame for obtaining the occurrence frequency data from the occurrence frequency counter 13 to 1 frame, and the number of degrees of the luminance level to 16, but the present invention is not limited to these cases.

INDUSTRIAL APPLICABILITY

As described in the foregoing, the image quality correcting circuit according to the present invention is not only capable of obtaining the optimum correcting characteristic according to the occurrence frequency data of each (luminance) level so that the image quality correction processing suiting any kind of image but also capable of preventing extreme variation of correcting curve or varying the correcting curve either intentionally or preferentially. Further, even when the distribution of the occurrence frequency of the luminance level varies largely at the time of the switching of the image or when displaying moving images, such extreme variations and resultant image quality deterioration can be prevented by implementing the image quality correction processing according to the present invention.

The invention claimed is:

1. An image quality correcting circuit comprising a luminance levels occurrence frequency counter (13) for counting the occurrence frequencies of plural luminance levels sampled from video signals inputted to a video signal input terminal (12), a linear interpolator (15) for generating a correcting characteristic line by making linear interpolation based on output points of counted values of the occurrence frequency counter (13), an image quality corrector (16) for correcting the inputted video signals according to correcting characteristic points, a plurality of discriminators (17) for determining the occurrence frequencies of plural luminance levels for every predetermined level, a plurality of first counters (19) for counting the occurrence frequencies for every predetermined level discriminated by the discriminators (17), a plurality of comparators (21) for comparing the outputs of the first counters (19) with reference values for comparison outputted from a reference value for a comparison input terminal 11 to clear the first counters (19) by the outputs for comparison and a plurality of second counters for counting the outputs of the comparators (21).

2. The image quality correcting circuit defined in claim 1, wherein the occurrence frequency counter (13) comprises the discriminators (17), the first counters, the comparators

(21) and the second counters (23), each comprising 16 series circuits, connected with one another.

3. An image quality correcting circuit comprising a mean value computer 10 for computing the mean value of luminance levels of every plural picture element sampled from video signals inputted from a video signal input terminal (12), an occurrence frequency counter (13) for counting the occurrence frequencies of predetermined plural luminance levels processed by a mean value computer (10), a linear interpolator (15) for generating a correcting characteristic line by making linear interpolation based on counted value points outputted from the occurrence frequency counter (13), an image quality corrector (16) for correcting the inputted video signals according to the correcting characteristic line, a plurality of discriminators (17) for determining the occurrence frequencies of plural luminance levels for every predetermined level, a plurality of first counters (19) for counting the occurrence frequencies for every predetermined level discriminated by the discriminators (17), a plurality of comparators (21) for comparing the outputs of the first counters (19) with reference values for comparison outputted from a reference value for a comparison input terminal 11 to clear the first counters (19) by the outputs for comparison and a plurality of second counters for counting the outputs of the comparators (21).

4. An image quality correcting circuit comprising an occurrence frequency counter (13) for counting the occurrence frequencies of plural luminance levels sampled from video signals inputted to a video signal input terminal (12), a correcting curve generator (25) for generating a new correcting curve based on counted value output point data of the occurrence frequency counter (13) and set point data previously inserted among the counted value points, an image quality correcting circuit (16), a plurality of discriminators (17) for determining the occurrence frequencies of plural luminance levels for every predetermined level, a plurality of first counters (19) for counting the occurrence frequencies for every predetermined level discriminated by the discriminators (17), a plurality of comparators (21) for comparing the outputs of the first counters (19) with reference values for comparison outputted from a reference value for a comparison input terminal 11 to clear the first counters (19) by the outputs for comparison and a plurality of second counters for counting the outputs of the comparators (21).

5. The image quality correcting circuit defined in claim 4, wherein the correcting curve generator (25) is designed for generating a new correcting curve by inserting either the counted value output point data of the occurrence frequency counter (13) or the predetermined set point data among other data.

6. The image quality correcting circuit defined in claim 4, wherein the correcting curve generator (25) comprises a circuit designed for generating a Bezier curve passing through a start point and an end point based on the counted value output point data of the occurrence frequency counter (13) and the predetermined set point data, either one of which is inserted among other data.

7. An image quality correcting circuit comprising a mean value computer (10) for computing the mean value of luminance levels of every plural picture element of a video signal inputted to a video signal input terminal (12), an occurrence frequency counter (13) for counting the occurrence frequencies of plural luminance levels computed by a mean value computer (10) for every predetermined level, a correcting curve generator (25) for generating a new correcting curve based on counted value output points of the occurrence frequency counter (13) and predetermined set points inserted among the counted value output points, an image quality corrector (16) for correcting the video signal according to the correcting curve generated by the correcting curve generator (25), a plurality of discriminators (17) for determining the occurrence frequencies of plural luminance levels for every predetermined level, a plurality of first counters (19) for counting the occurrence frequencies for every predetermined level discriminated by the discriminators (17), a plurality of comparators (21) for comparing the outputs of the first counters (19) with reference values for comparison outputted from a reference value for a comparison input terminal 11 to clear the first counters (19) by the outputs for comparison and a plurality of second counters for counting the outputs of the comparators (21).

8. An image quality correcting circuit comprising an occurrence frequency counter for counting the occurrence frequencies of luminance levels of picture elements of an inputted video signal within N number of frames, N being an integer of at least 2, a variation controller controlling, for output, the variation of the counted value of the occurrence frequency counter within a period ranging over several times the N-frame period, a linear interpolator for forming a correcting characteristic line by linear interpolation based on the counted value outputted from the variation controller, and an image quality corrector for correcting the inputted video signal according to the correcting characteristic line formed by a linear interpolator.

9. The image quality correcting circuit defined in claim 8, wherein the occurrence frequency counter comprises a plurality of discriminators for determining whether or not the luminance level of each picture element of the inputted video signal corresponds to each of plural set levels, a plurality of first counters for counting the number of times of determination made by each discriminator, a plurality of comparators for comparing the counted value of the first counter with a predetermined reference value for comparison to clear the first counter by the comparison output, and a plurality of second counters for counting the number of times of the output of the comparator for use as an appearance frequency.

10. The image quality correcting circuit defined in claim 8, wherein the variation controller comprises a difference detector, a constant multiplier, an adder and a N-frame delayer; the difference detector outputs the difference between the counted value of the occurrence frequency counter and the output value of the N-frame delayer; the constant multiplier multiplies the output value of the difference detector by 1/X for output, X being an integer of at least 2; the adder adds the output value of the N-frame delayer to the output value of the constant multiplier; the N-frame delayer delays the sum obtained by the adder by N frames not only for output to the difference detector and the adder but also for output as the variation-controlled output.

11. The image quality correcting circuit defined in claim 9, wherein the variation controller comprises a difference detector, a constant multiplier, an adder and an N-frame delayer; the difference detector outputs the difference between the counted value of the second counter and the output value of the N-frame delayer; the constant multiplier multiplies the output value of the N-frame delayer by coefficient 1/X for output, X being an integer of at least 2; the adder adds the output value of the constant multiplier to the output value of the N-frame delayer; the N-frame delayer delays the sum obtained by the adder by N number of frames not only for output to the difference detector and the adder but also for variation-controlled output.

12. An image quality correcting circuit comprising a mean value computer for computing the mean value of luminance levels of m number of picture elements of an inputted video signal, m being an integer of at least 2, an occurrence frequency counter for counting the occurrence frequencies of luminance levels computed by a mean value computer within a N-frame period for every plural set level ranges, N being an integer of at least 2, a variation controller for controlling, for output, the variation of the counted value of the occurrence frequency counter ranging over plural number of times of the N-frame period, a linear interpolator for forming a correcting characteristic line by linear interpolation based on the counted value outputted from the variation controller, and an image quality corrector for correcting the inputted video signal according to the correcting characteristic line formed by the linear interpolator.

13. The image quality correcting circuit defined in claim 12, wherein the occurrence frequency counter comprises a plurality of discriminators for determining whether or not the luminance levels computed by the mean value computer respectively correspond to the set level ranges, a plurality of first counters for counting the number of times of determinations made by the discriminators, a plurality of comparators for comparing the counted values of the first counters with predetermined reference values for comparison to clear the first counters by the output for comparison, and a plurality of second counters for counting the number of times of outputs of the comparators for use as the occurrence frequencies.

14. The image quality correcting circuit defined in claim 13, wherein the variation controller comprises a difference detector, a constant multiplier, an adder and an N-frame delayer; the difference detector outputs the difference between the counted value of the second counter and the output of the N-frame delayer; the constant multiplier multiplies the output value of the N-frame delayer by the coefficient 1/X for output, X being an integer of at least one; the adder adds the output value of the constant multiplier to the output value of the N-frame delayer; the N-frame delayer delays the sum obtained by the adder by N frames not only for output to the difference detector but also for variation-controlled output.

15. An image quality correcting circuit comprising an occurrence frequency counter for counting the occurrence frequencies of luminance levels of the picture elements of the inputted video signals within N number of frames, N being an integer of at least 2, a variation controller for controlling, for output, the variation of the counted value of the occurrence frequency counter ranging over plural number of times of a N-frame period, a correcting curve generator for generating a new correcting curve based on the counted values outputted from the variation controller and predetermined set values, and an image quality corrector for correcting the inputted video signal according to the correcting curve generated by the correcting curve generator.

16. An image quality correcting circuit comprising a mean value computer for computing the mean value of the luminance levels of m number of picture elements of inputted video signals, m being an integer of at least 2, an occurrence frequency counter for counting the occurrence frequencies of the luminance levels computed by a mean value computer ranging over an N-frame period for every plural set levels, N being an integer of at least 2, a variation controller for controlling, for output, the variation of the counted value of the occurrence frequency counter ranging over a period of plural times of the N-frame period, a correcting curve generator for generating a new correcting curve based on the counted values outputted from the variation controller and predetermined set values, and an image quality corrector for correcting the inputted video signal according to the correcting curve generated by the correcting curve generator.

17. An image quality correcting circuit comprising occurrence frequency counter (13) for counting occurrence frequency data of plural luminance levels sampled from a video signal inputted to a video signal input terminal (12) for every predetermined level, a correcting characteristic control circuit (29) for selectively outputting an upper limit value when a counted value of a correcting characteristic point outputted from the occurrence frequency counter (13) is greater than a predetermined upper limit value, while selectively outputting a lower limit value when the same is smaller than a lower limit value, a correcting curve generator (48) for generating a correcting curve according to the output of the correcting characteristic control circuit (29), and an image quality corrector (16) for correcting the inputted video signal according to the correcting curve generated by the correcting curve generator (48).

18. The image quality correcting circuit defined in claim 17, wherein the occurrence frequency counter comprises a mean value computer for computing the mean value of the luminance levels of plural picture elements of the video signal inputted to the video signal input terminal (12) and a counter for counting the occurrence frequencies of plural luminance levels computed by a mean value computer (10) for every predetermined level.

19. The image quality correcting circuit defined in claim 17, wherein the correcting characteristic point control circuit (29) comprises a control range comparator (43) for comparing a counted value of the correcting characteristic point and a linearly varying upper limit value and lower limit value, a correcting characteristic point selector (47) for selecting the upper limit value, lower limit value or the counted value of the occurrence frequency counter (13) according to the output of the control range comparator (43), and a control counter (40) for controlling the order of processing of the correcting characteristic point.

20. The image quality correcting circuit defined in claim 19, wherein the control range comparator (43) comprises an upper limit comparator (41a) for comparing the counted value Pn of the correcting characteristic point and the linearly varying upper limit value an+w and a lower limit comparator (42a) for comparing the counted value Pn of the correcting characteristic point and the lower limit value an−w, and a control range setter (46) comprises an upper limit setter (44a) for setting the upper limit value an+w and a lower limit setter (45a) for setting the lower limit value an−w.

21. The image quality correcting circuit defined in claim 17, wherein the correcting characteristic control circuit 29 comprises a control range comparator (43) for comparing a counted value Pn of the correcting characteristic point with the upper limit values and the lower limit values on a correcting characteristic line passing through the start point and the end point, which vary quadratically around intermediate portions thereof, a correcting characteristic point selector (47) for selecting the upper limit value, lower limit value or counted value of the occurrence frequency counter (13), and a control counter (40) for controlling the order of processing for the correcting characteristic points.

22. The image quality correcting circuit defined in claim 21, wherein the control range comparator 43 comprises an upper limit comparator 41b for comparing the counted value Pn of the correcting characteristic point with a quadratically variable upper limit value YHn, and a lower limit comparator 42b for comparing the counted value Pn of the correcting characteristic point with a lower limit value YLn, while a control range setter 46 comprises an upper limit setter 44b for setting the upper limit value YHn and a lower limit setter 45b for setting the lower limit YLn.

* * * * *